US012771254B2

(12) United States Patent
Werner et al.

(10) Patent No.: US 12,771,254 B2
(45) Date of Patent: *Oct. 20, 2026

(54) POWER CONVERTER CONTROLLER WITH BRANCH SWITCH

(71) Applicant: POWER INTEGRATIONS, INC., San Jose, CA (US)

(72) Inventors: Antonius Jacobus Johannes Werner, Cambridge (GB); Arthur B. Odell, Morgan Hill, CA (US); Giao Minh Pham, Milpitas, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/627,299

(22) Filed: Apr. 4, 2024

(65) Prior Publication Data

US 2024/0250615 A1 Jul. 25, 2024

Related U.S. Application Data

(63) Continuation of application No. 17/401,198, filed on Aug. 12, 2021, now Pat. No. 11,979,090.

(51) Int. Cl.

*H02M 3/335* (2006.01)
*H02M 1/32* (2007.01)
*H02M 1/00* (2006.01)

(52) U.S. Cl.

CPC ......... *H02M 3/33569* (2013.01); *H02M 1/32* (2013.01); *H02M 1/0006* (2021.05)

(58) Field of Classification Search

CPC ............................ H02M 3/33569; H02M 1/32

See application file for complete search history.

(56) References Cited

U.S. PATENT DOCUMENTS 4,005,352 A 1/1977 Kugler et al.
5,014,178 A 5/1991 Balakrishnan (Continued)

FOREIGN PATENT DOCUMENTS

CN 103023298 A 4/2013
CN 115113670 A 9/2022

(Continued)

OTHER PUBLICATIONS

Broadmeadow, Mark; "Characterisation of the cascode gate drive of power MOSFETs in clamped inductive switching applications, " Mar. 25, 2015, Queensland University of Technology, pp. 81-85.

(Continued)

*Primary Examiner* — Peter M Novak

(57) ABSTRACT

A controller for a power converter comprising a driver configured to provide a drive signal to control a power switch, wherein the power switch includes a first switch and a second switch, and a terminal configured to receive operating power for the controller. The controller comprises a branch switch coupled to the second switch, a branch control configured to turn ON the branch switch in response to a comparison of a voltage at the terminal with a reference to conduct a branch current which is at least a first portion of a drain current conducted by the first switch, and a regulator configured to sense the branch current, wherein the regulator and driver are configured to regulate the branch current to not exceed a threshold by controlling a second switch current conducted by the second switch, wherein the second switch current is a second portion of the drain current.

28 Claims, 9 Drawing Sheets

(56) References Cited

U.S. PATENT DOCUMENTS

| | | | |
|---|---|---|---|
| 5,282,107 A * | 1/1994 | Balakrishnan | H03K 17/0822 361/86 |
| 5,285,369 A | 2/1994 | Balakrishnan | |
| 5,602,724 A | 2/1997 | Balakrishnan | |
| 6,583,663 B1 | 6/2003 | Disney | |
| 6,597,588 B2 | 7/2003 | Matsumoto | |
| 6,775,155 B2 | 8/2004 | Park | |
| 6,865,093 B2 | 3/2005 | Disney | |
| 7,157,813 B2 | 1/2007 | Djenguerian et al. | |
| 7,345,894 B2 | 3/2008 | Sawtell et al. | |
| 7,489,120 B2 | 2/2009 | Matthew | |
| 7,932,738 B1 | 4/2011 | Banerjee et al. | |
| 8,063,622 B2 | 11/2011 | Kung et al. | |
| 8,077,486 B2 | 12/2011 | Djenguerian et al. | |
| 8,120,097 B2 | 2/2012 | Disney | |
| 8,159,843 B2 | 4/2012 | Lund et al. | |
| 8,294,377 B2 | 10/2012 | Kang et al. | |
| 8,305,826 B2 | 11/2012 | Banerjee et al. | |
| 8,779,841 B2 | 7/2014 | Ivankovic | |
| 8,933,649 B2 | 1/2015 | Matthews et al. | |
| 9,112,428 B2 | 8/2015 | Bailey et al. | |
| 9,219,420 B1 | 12/2015 | Zhang et al. | |
| 9,287,784 B2 | 3/2016 | Zhang et al. | |
| 9,331,587 B2 | 5/2016 | Djenguerian et al. | |
| 9,479,065 B2 | 10/2016 | Mao et al. | |
| 9,531,264 B2 | 12/2016 | Ryan et al. | |
| 9,577,520 B2 | 2/2017 | Xiu et al. | |
| 9,602,009 B1 | 3/2017 | Baurle | |
| 9,621,050 B2 | 4/2017 | Ryan et al. | |
| 9,667,154 B2 | 5/2017 | Colbeck | |
| 9,735,663 B2 | 8/2017 | Bhasin et al. | |
| 9,871,510 B1 | 1/2018 | Horwitz et al. | |
| 9,917,584 B2 | 3/2018 | Gong et al. | |
| 9,954,461 B1 | 4/2018 | Duvnjak | |
| 9,983,239 B2 | 5/2018 | Mayell | |
| 10,014,784 B1 | 7/2018 | Yee et al. | |
| 10,038,434 B2 | 7/2018 | Volke et al. | |
| 10,135,357 B1 | 11/2018 | Balakrishnan et al. | |
| 10,177,666 B2 | 1/2019 | Djenguerian et al. | |
| 10,326,306 B2 | 6/2019 | Peter et al. | |
| 10,404,180 B2 | 9/2019 | Greenwood | |
| 10,551,224 B2 | 2/2020 | Kobayashi et al. | |
| 10,644,688 B2 | 5/2020 | Wang | |
| 10,924,028 B2 | 2/2021 | Duvnjak | |
| 11,258,369 B2 | 2/2022 | Odell | |
| 11,418,121 B2 | 8/2022 | Odell et al. | |
| 11,979,090 B2 | 5/2024 | Werner et al. | |
| 12,261,533 B2 | 3/2025 | Bonavente et al. | |
| 2012/0133348 A1 | 5/2012 | Fan et al. | |
| 2013/0077353 A1 | 3/2013 | Kuang et al. | |
| 2014/0077867 A1 | 3/2014 | Chen | |
| 2015/0244248 A1* | 8/2015 | Knoedgen | H02M 3/33507 363/21.01 |
| 2019/0393871 A1 | 12/2019 | Springett | |
| 2021/0203235 A1 | 7/2021 | Odell et al. | |
| 2021/0257923 A1 | 8/2021 | Odell | |
| 2021/0351707 A1 | 11/2021 | Bianco et al. | |
| 2022/0393603 A1 | 12/2022 | Chen | |
| 2023/0051129 A1 | 2/2023 | Werner et al. | |
| 2023/0188046 A1 | 6/2023 | Chen et al. | |
| 2024/0186903 A1 | 6/2024 | Matthews | |
| 2024/0213903 A1 | 6/2024 | Matthews et al. | |
| 2025/0211120 A1 | 6/2025 | Ezra et al. | |

FOREIGN PATENT DOCUMENTS

| | | |
|---|---|---|
| JP | 2015195677 A | 11/2015 |
| JP | 2018007507 A | 1/2018 |
| WO | 2021126826 A1 | 6/2021 |

OTHER PUBLICATIONS

European Application Serial No. 22185215.5; "Communication pursuant to Article 94(3) EPC"; mailed Jan. 26, 2024; 6 pages.

European Application Serial No. 22185215.5; "Extended European Search Report"; mailed Dec. 22, 2022; 8 pages.

Jia, Liang et al.; "Cascode Switching Modeling and Improvement in Flyback Converter for LED Lighting Applications"; IEEE 978-1-5386-1189-7/18; 2018; 8 pages.

Machine translation of CN103023298A; published Nov. 5, 2014; 7 pages.

Power Integrations, Inc., "LinkSwitch-TN2 Family: Highly Energy Efficient Off-line Switcher IC with Integrated System Level Protection for Low Component-Count Power Supplies", Jun. 2023, 28 pages.

U.S. Appl. No. 18/061,191; "Non-Final Office Action mailed Apr. 2, 2025"; 16 pages.

U.S. Appl. No. 18/393,278; "Non-Final Office Action mailed Aug. 11, 2025"; 9 pages.

U.S. Appl. No. 18/061,191; "Non-Final Office Action mailed Aug. 25, 2025"; 22 pages.

Indian Application Serial No. 202214045885; "First Examination Report with Machine Translation"; mailed Nov. 11, 2025; 8 pages.

U.S. Appl. No. 18/061,191, Non-Final Office Action mailed Feb. 4, 2026; 25 pages.

* cited by examiner

POWER CONVERTER CONTROLLER WITH BRANCH SWITCH

CROSS REFERENCE TO RELATED APPLICATIONS

This application is a continuation of U.S. application Ser. No. 17/401,198, filed Aug. 12, 2021 and issued as U.S. Pat. No. 11,979,090. U.S. application Ser. No. 17/401,198 is incorporated in its entirety herein by reference.

BACKGROUND OF THE INVENTION

Field of the Invention

The present disclosure relates generally to power converters, and more particularly, to controllers for power converters.

Discussion of the Related Art

Electronic devices use power to operate. Switched mode power converters are commonly used due to their high efficiency, small size and low weight to power many of today's electronics. Conventional wall sockets provide a high voltage alternating current. In a switching power converter, a high voltage alternating current (ac) input is converted to provide a well-regulated direct current (dc) output through an energy transfer element. The switched mode power converter controller usually provides output regulation by sensing one or more signals representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

Power converters generally include one or more controllers which sense and regulate the output of the power converter. These controllers generally require a regulated or unregulated voltage source to power the circuit components of the controller. A bypass capacitor coupled to a controller may provide operating power to the circuits of the controller.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
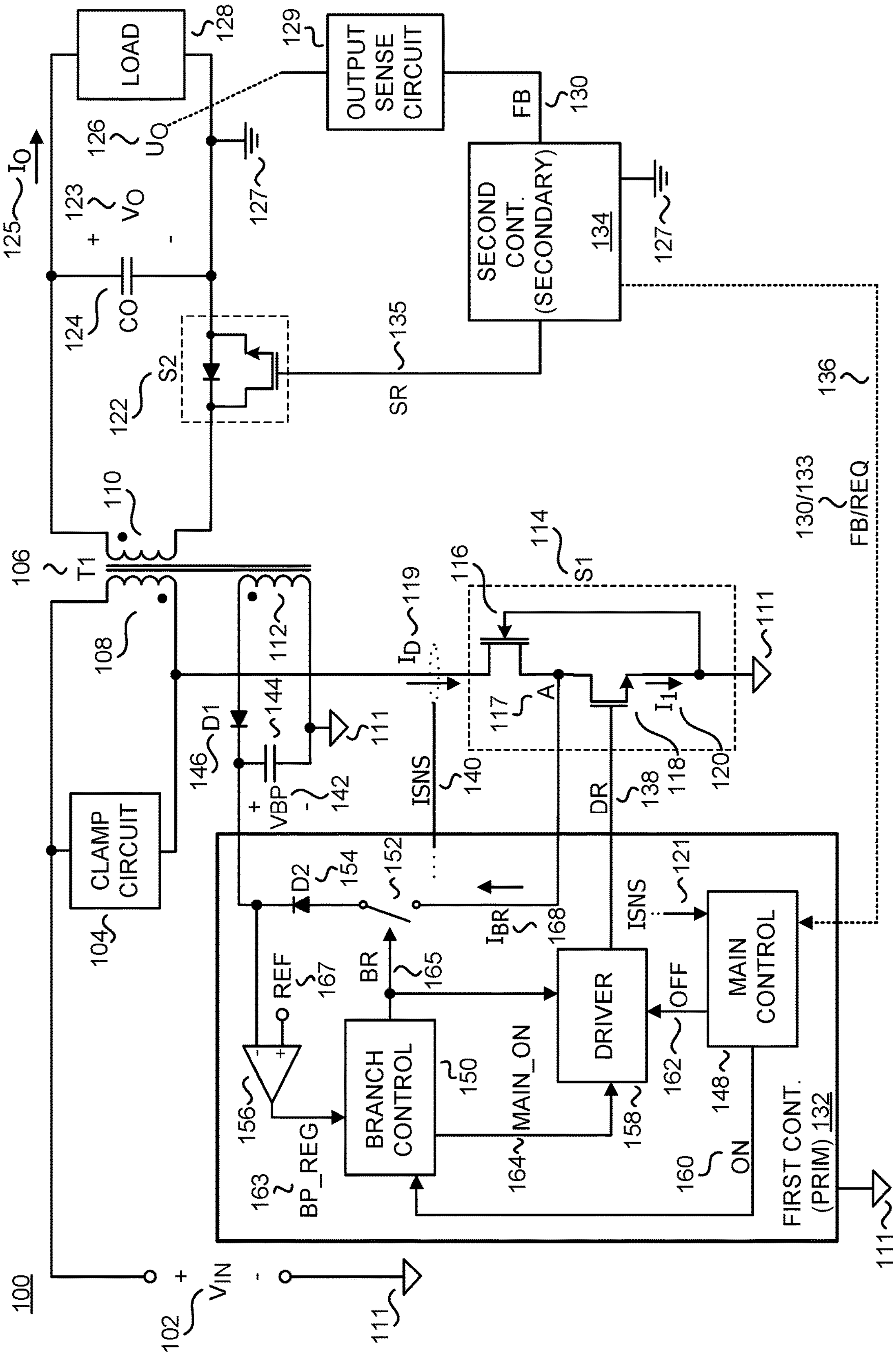
FIG. 1 is a schematic diagram of an example isolated power converter including a controller with a branch switch and branch control, in accordance with embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Power converters generally include one or more controllers which sense and regulate the output of the power converter. These controllers generally require a regulated or unregulated voltage source to power the circuit components of the controller. A bypass capacitor is one example of a voltage source which could be coupled to a controller which may provide operating power to the circuits of the controller. The bypass capacitor is generally regulated to provide sufficient operating power for the controller.

An isolated power converter may include a primary controller, also referred to as a first controller or input controller, and a secondary controller, also referred to as a second controller or output controller, which are galvanically isolated from one another by an energy transfer element (e.g., a coupled inductor, transformer, etc.). In other words, a dc voltage applied between input side and output side of the power converter will produce substantially zero current.

The primary controller is configured to control a power switch on the primary side of the isolated power converter to control the transfer of energy from the primary winding of the energy transfer element to the secondary winding of the energy transfer element. The secondary controller is coupled to circuit components on the secondary side of the isolated power converter. It should be appreciated that the primary side may also be referred to as the input side while the secondary side may be referred to as the output side. The secondary controller may also be configured to control a secondary switch coupled to the secondary winding of the energy transfer element, such as a transistor used as a synchronous rectifier for the power converter. Although the primary controller and the secondary controller are galvanically isolated from one another, the secondary controller may transmit a signal to the primary controller which controls how the primary controller switches the power switch to transfer energy to the secondary side.

In general, both the primary side and the secondary side of the power converter each include a bypass capacitor to provide operating power to circuits of the primary controller or the secondary controller, respectively. The bypass capacitor for the primary controller is generally coupled to an auxiliary (or bias) winding of an energy transfer element, such as a transformer or coupled inductor, and the bypass capacitor is charged from the auxiliary winding. The bypass voltage across the bypass capacitor is generally regulated to a sufficient level to operate circuits of the primary controller. For example, the bypass voltage may be regulated to substantially 5 volts (V).

As mentioned above, the primary controller is configured to control a power switch on the primary side of the isolated power converter to control the transfer of energy between the input and the output of the power converter. In one example, the power switch may be a cascode switch (or a hybrid switch). A cascode switch (or a hybrid switch) may include a first switch and a second switch. The first switch is generally a normally on-device while the second cascode switch is generally a normally-off device. The cascode switch has three terminals, a source, a gate, and a drain. In one example, the normally-on device (e.g. first switch) may be a high-voltage GaN transistor, while the normally-off device (e.g. second switch) may be a low-voltage MOSFET. The source and gate of the normally-off device (e.g., MOSFET) are used as the source and gate of the cascode switch, while the drain of the normally-on device (e.g., GaN transistor) is used as the drain of the cascode switch. The source of the normally-on device (e.g., GaN transistor) is coupled to the drain of the normally-off device (e.g., MOSFET). The normally-off device (e.g., MOSFET) is generally used to turn on and off the normally-on device (e.g., GaN transistor). A switch that is off (or open) cannot conduct current, while a switch that is on (or closed) may conduct current. The node between the normally-off device and the normally-on device may be referred to as an intermediate node.

Embodiments of the present invention include a power switch in a cascode configuration and a bypass capacitor coupled to an intermediate node between the first switch and the second switch of the cascode power switch. The power switch is controlled such that at least a portion of current conducted by the first switch is redirected to the bypass capacitor and utilized to charge the bypass capacitor. In other words, the power switch is controlled such that at least a portion of current conducted by the first switch is utilized to regulate the bypass voltage across the bypass capacitor. In a further embodiment, the second switch may also be utilized to control the amount of current redirected to charge the bypass capacitor. In other words, the second switch may also be utilized to control the amount of the portion of current redirected to the bypass capacitor from the first switch. As mentioned above, the bypass capacitor provides operating power.

In embodiments of the present invention, a controller includes a branch switch and branch control. In one example, the branch switch is coupled between the intermediate node of the cascode power switch and the bypass capacitor for the controller. The branch control is configured to control the turn on and turn off of the branch switch. In embodiments, branch control turns on the branch switch when the bypass capacitor voltage falls below a bypass reference. Current conducted by the first switch is redirected to the branch switch and conducted by the branch switch to charge the bypass capacitor. In other words, the branch switch is controlled such that current conducted by the first switch is utilized to regulate the bypass voltage of the bypass capacitor.

In another embodiment, the controller further includes a shunt regulator to control the amount of current conducted by the branch switch. As such, a portion of the current conducted by the first switch is redirected and conducted by the branch switch to charge the bypass capacitor. The second switch of the power cascode switch is controlled to shunt the remaining current conducted by the first switch and as such controls the amount of current conducted by the branch switch. The bypass capacitor provides operating power for the controller.

FIG. 1 illustrates a power converter 100 including a first controller 132 (e.g. primary controller) including a branch switch 152 and branch control 150, in accordance with embodiments of the present disclosure. The illustrated power converter 100 further includes a clamp circuit 104, energy transfer element T1 106, an input winding 108 of the energy transfer element T1 106, an output winding 110 of the energy transfer element T1 106, an auxiliary winding 112 of the energy transfer element T1 106, a power switch S1 114, an input return 111, an output rectifier S2 122, an output capacitor CO 124, an output return 127, an output sense circuit 129, a second controller 134 (e.g. secondary controller), the first controller 132 (e.g. primary controller), a bypass capacitor 144 (e.g. supply capacitor for the first controller 132), and diode D1 146. A communication link 136 between the second controller 134 and the first controller 123 is also illustrated. The power switch S1 114 is shown as a cascode switch (or a hybrid switch) including a first switch 116, a second switch 118 with an intermediate node A 117 between the first switch 116 and second switch 118. The first controller 132 is shown as including a main control

148, the branch control 150, the branch switch 152, a diode D2 154, a comparator 156, and a driver 158.

Further shown in FIG. 1 are an input voltage $V_{IN}$ 102, a drain current $I_D$ 119, a second switch current $I_1$ 120, an output voltage $V_O$ 123, an output current $I_O$ 125, an output quantity $U_O$ 126, a feedback signal FB 130, a request signal REQ 133, a second drive signal SR 135, a primary drive signal DR 138, a current sense signal ISNS 140, a bypass voltage $V_{BP}$ 142, an on signal ON 160, an off signal OFF 162, a bypass regulation signal BP_REG 163, a main on signal MAIN_ON 164, a branch drive signal BR 165, a reference REF 167 (e.g. bypass reference), and a branch current $I_{BR}$ 168.

In the illustrated example, the power converter 100 is shown as having a flyback topology but it should be appreciated that other known topologies and configurations of power converters may also benefit from the teachings of the present disclosure. Further, the input side of power converter 100 is galvanically isolated from the output side of the power converter 100, such that input return 111 is galvanically isolated from output return 127. Since the input side and output side of power converter 100 are galvanically isolated, there is no direct current (dc) path across the isolation barrier of energy transfer element T1 106, or between input winding 108 and output winding 110, or between auxiliary winding 112 and output winding 110, or between input return 111 and output return 127.

The power converter 100 provides output power to a load 128 from an unregulated input voltage $V_{IN}$ 102. In one embodiment, the input voltage $V_{IN}$ 102 is a rectified and filtered ac line voltage. In another embodiment, the input voltage $V_{IN}$ 102 is a dc input voltage. The input voltage $V_{IN}$ 102 is coupled to the energy transfer element 106. In some examples, the energy transfer element 106 may be a coupled inductor, transformer, or an inductor. The energy transfer element 106 is shown as including three windings, input winding 108 (also referred to as a primary winding), output winding 110 (also referred to as a secondary winding), and an auxiliary winding 112 (also referred to as a bias winding or a tertiary winding). However, the energy transfer element 106 may have more than three windings. The input winding 108 of the energy transfer element is further coupled to the power switch S1 114 which is further coupled to input return 111. Coupled across the input winding 108 is the clamp circuit 104. The clamp circuit 104 limits the maximum voltage on the power switch S1 114.

As shown in FIG. 1, the power switch S1 114 is a cascode switch including first switch 116 and second switch 118. The first switch 116 is generally a normally on-device while the second switch 118 is generally a normally-off device. The cascode power switch S1 114 has three terminals: a source, a gate, and a drain. In one example, the normally-on device (e.g. first switch 116) may be a high-voltage transistor, while the normally-off device (e.g. second switch 118) may be a low-voltage transistor. In one example, the high-voltage transistor utilized for the first switch 116 may be rated to approximately 750 volts (V) while the low-voltage transistor utilized for the second switch 118 may be rated between 25-30 V. The source and gate of the second switch 118 (e.g. normally-off device) is used as the source and gate of the cascode power switch 114, while the drain of the first switch 116 (e.g. normally-on device) is used as the drain of the cascode power switch 114. In one example, the source of the first transistor 116 (e.g. normally-on device) is coupled to the drain of the second transistor 118 (e.g. normally-off device). The gate of the first transistor 116 is shown as coupled to the source of the second transistor 118, which is coupled to input return 111. It should be appreciated that the gate of the first transistor 116 may also be coupled directly to input return 111. An intermediate node A 117 is shown as the coupling between the source of the first transistor 116 and the drain of the second transistor 118. The second transistor 118 is generally used to turn on and off the first transistor 116 (normally-on device). In one example, the first switch 116 may be a transistor such as a gallium nitride (GaN) based transistor or a silicon carbide (SiC) based transistor. The second switch 118 may be a transistor such as a metal-oxide-semiconductor field-effect transistor (MOSFET), bipolar junction transistor (BJT), or an insulated-gate bipolar transistor (IGBT). In one example, the current conducted by the first switch 116 is denoted by the drain current $I_D$ 119 while the current conducted by the second switch 118 is denoted as the second switch current $I_1$ 120.

Output winding 110 is coupled to the output rectifier S2 122, which is exemplified as a transistor used as a synchronous rectifier. However, the output rectifier may be exemplified as a diode. Output capacitor CO 124 is shown as being coupled to the output rectifier S2 122 and the output return 127. The power converter 100 further includes circuitry to regulate the output quantity $U_O$ 126, which in one example may be the output voltage $V_O$ 123, output current $I_O$ 125, or a combination of the two. The output sense circuit 129 is configured to sense the output quantity $U_O$ 126 to provide the feedback signal FB 130, representative of the output of the power converter 100, to the second controller 134.

The second controller 134 is configured to output the request signal REQ 133 in response to the feedback signal FB 130. In another example, the second controller 134 is configured to pass along the feedback signal FB 130 to the first controller 132. For the example of a request signal REQ 133, the request signal REQ 133 is representative of a request to turn ON the power switch S1 114. The request signal REQ 133 may include request events which are generated in response to the feedback signal FB 130. In one example operation, the second controller 134 is configured to compare the feedback signal FB 130 with a regulation reference. In response to the comparison, the second controller 134 may output a request event in the request signal REQ 133 to request the first controller 132 to turn ON the power switch S1 114. The request signal REQ 133 may be a rectangular pulse waveform which pulses to a logic high value and quickly returns to a logic low value. The logic high pulses may be referred to as request events. In other embodiments it is understood that request signal REQ 133 could be an analog, continually varying signal, rather than a pulsed waveform, while still benefiting from the teachings of the present disclosure.

The second controller 134 and the first controller 132 may communicate via the communication link 136. For the example shown, the second controller 134 is coupled to the secondary side of the power converter 100 and is referenced to the output return 127 while the first controller 132 is coupled to the primary side of the power converter 100 and is referenced to the input return 111. In embodiments, the first controller 132 and the second controller 134 are galvanically isolated from one another and communication link 136 provides galvanic isolation using an inductive coupling (such as a transformer or a coupled inductor, an optocoupler), capacitive coupling, or other device that maintains the isolation. However, it should be appreciated that in some embodiments, the second controller 134 is not galvanically isolated from the first controller 132. In one example, the communication link 136 may be an inductive coupling formed from a leadframe which supports the first controller 132 and/or the second controller 134.

In one example, the first controller 132 and second controller 134 may be formed as part of an integrated circuit that is manufactured as either a hybrid or monolithic integrated circuit. In one example, the power switch S1 114 may also be integrated in a single integrated circuit package with the first controller 132 and the second controller 134. In addition, in one example, first controller 132 and second controller 134 may be formed as separate integrated circuits. The power switch S1 114 may also be integrated in the same integrated circuit as the first controller 132 or could be formed on its own integrated circuit. In particular, the second switch 118 of the power switch S1 114 may be integrated in the same integrated circuit as the first controller 132 while the first switch 116 of the power switch S1 114 is integrated in its own integrated circuit. Further, it should be appreciated that both the first controller 132, the second controller 134 and power switch S1 114 need not be included in a single package and may be implemented in separate controller packages or a combination of combined/separate packages.

The first controller 132 is coupled to receive a current sense signal ISNS 140 representative of the drain current $I_D$ 119 of the power switch S1 114 and the request signal REQ 133 or feedback signal FB 130 through the communication link 136 and outputs the primary drive signal DR 138. The first controller 132 provides the primary drive signal DR 138 to the power switch S1 114 to control various switching parameters of the power switch S1 114 to control the transfer of energy from the input of to the output of the power converter 100 through the energy transfer element 106. Example of such parameters include switching frequency $f_{SW}$ (or switching period $T_{SW}$), duty cycle, on-time and off-times, or varying the number of pulses per unit time of the power switch S1 114. In addition, the power switch S1 114 may be controlled such that it has a fixed switching frequency or a variable switching frequency.

In one embodiment, the first controller 132 outputs the primary drive signal DR 138 to control the conduction of the power switch S1 114. In particular, the first controller 132 outputs the primary drive signal DR 138 to control the conduction of the second switch 118. In one example, the first controller 132 outputs the primary drive signal DR 138 to turn ON the power switch S1 114 in response to a request event in the request signal REQ 133 or to the information provided by the feedback signal FB 130. In another example, the first controller 132 outputs the primary drive signal DR 138 to turn OFF the power switch S1 114 when the drain current $I_D$ 119 provided by the current sense signal ISNS 140 reaches a current limit. It should be appreciated that other control methods could be used.

Energy transfer element T1 106 includes the auxiliary winding 112 referenced to input return 111. The auxiliary winding 112 is shown as coupled to a diode D1 146 and the bypass capacitor 144. For the power converter 100 shown in FIG. 1, the bypass voltage VBP 142 of the bypass capacitor 144 can be derived from the voltage across the auxiliary winding 112. Bypass capacitor 144 is coupled to the first controller 132 to provide operational power for the circuits of the first controller 132.

The bypass voltage VBP 142 can also be derived from the drain current $I_D$ 119 being redirected to the bypass capacitor 144 from the first switch 116 of power switch S1 114. In embodiments, the entire drain current $I_D$ 119 or a portion of the drain current $I_D$ 119 is redirected to the bypass capacitor 144. As will be discussed with respect to this figure, the branch switch 152 is controlled to redirect the drain current $I_D$ 119 (e.g. the current conducted by the first switch 116) to charge the bypass capacitor 144. In another embodiment discussed with respect to FIG. 3, the branch switch redirects a portion of the drain current $I_D$ 119 to charge the bypass capacitor 144 and the second switch 118 is utilized to control the portion of the drain current $I_D$ 119 which is redirected to charge the bypass capacitor 144.

Comparator 156 is coupled to the bypass capacitor 144 and receives the bypass voltage VBP 142 at its inverting input. Comparator 156 also receives reference REF 167, also referred to as a bypass reference, at its non-inverting input. Output of the comparator 156 is denoted as the bypass regulation signal BP_REG 163. In one example, reference REF 167 is representative of the desired regulated value for the bypass voltage VBP 142. The comparator 156 compares the bypass voltage VBP 142 to the reference REF 167. As shown, the bypass regulation signal BP_REG 163 is a logic high value if the bypass voltage VBP 142 is less than the reference REF 167 and a logic low value if the bypass voltage VBP 142 is greater than the reference REF 167. In other words, an asserted bypass regulation signal BP_REG 163 indicates that the bypass voltage VBP 142 has fallen below the reference REF 167 (e.g. logic high value). It should be appreciated that the comparator 156 may also utilize hysteresis.

In the embodiment shown, the branch switch 152 is controlled to redirect the drain current $I_D$ 119 to the bypass capacitor 144 when the bypass voltage VBP 142 is less than the reference REF 167. In another embodiment, the branch switch 152 is controlled to redirect a portion of the drain current $I_D$ 119 when the bypass voltage VBP 142 is less than the reference REF 167. In other words, the branch switch 152 is turned ON when the bypass voltage VBP 142 is less than the reference REF 167. Further the first controller 132 is configured to control the power switch S1 114 such that at least a portion of the drain current $I_D$ 119 is utilized to charge the bypass capacitor 144.

The first controller 132 is shown as including main control 148, branch control 150, branch switch 152, diode D2 154, comparator 156, and driver 158. Main control 148 is configured to receive the request signal REQ 133 or the feedback signal FB 130 and the current sense signal ISNS 140 and outputs the on signal ON 160 and the off signal OFF 162. In one example, both the on signal ON 160 and the off signal OFF 162 are rectangular pulse waveforms with varying durations of logic high and logic low sections. The on signal ON 160 is representative of controlling the power switch S1 114 ON while the off signal OFF 162 is representative of controlling the power switch S1 114 OFF. A logic high value for the on signal ON 160 (e.g. asserted) corresponds to turning ON the power switch S1 114, and in particular, representative of turning ON the second switch 118. Similarly, a logic high value for the off signal OFF 162 (e.g. asserted) corresponds to turning OFF the power switch S1 114, and in particular, representative of turning OFF the second switch 118. It should be appreciated the off signal OFF 162 is the inverted version of the on signal ON 160.

Main control 148 determines to turn ON the power switch S1 114 in response to the request signal REQ 133 or the feedback signal FB 130. In operation, the main control 148 determines to turn ON the power switch S1 114, in particular the second switch 118, in response to a request event in the request signal REQ 133. In another example, the main control 148 determines to turn ON the power switch S1 114, in particular the second switch 118, in response to the feedback signal FB 130 indicating that the output of the power converter 100 has fallen out of regulation. In operation, the on signal ON 160 is asserted and the off signal OFF 162 is deasserted.

Main control 148 also determines to turn OFF the power switch S1 114 in response to the current sense signal ISNS 140 indicating the drain current $I_D$ 119 has reached a current limit ILIM. It should be appreciated that other control schemes could be implemented by main control 148 to control the transfer of energy from the input side to the output side of power converter 100. For turning OFF the power switch S1 114, the off signal OFF 162 is asserted while the on signal ON 160 is deasserted.

Branch control 150 is configured to receive the on signal ON 160, and the bypass regulation signal BP_REG 163 and outputs the branch drive signal BR 165 and the main ON signal MAIN_ON 164. The branch drive signal BR 165 is the control signal to turn ON and OFF the branch switch 152 and in one example is a rectangular pulse waveform with varying durations of logic high and logic low sections. Logic high sections represent an asserted signal to turn ON branch switch 152 while logic low sections represent a deasserted signal to turn OFF branch switch 152. The main on signal MAIN_ON 164 is the control signal to turn ON and OFF the power switch S1 114, in particular the second switch 118, and is also a rectangular pulse waveform with varying durations of logic high and logic low sections. Logic high sections represent an asserted signal to turn ON second switch 118 while logic low sections represent a deasserted signal to turn OFF second switch 118. If branch control is not controlling the branch switch 152 to be ON (e.g., branch drive signal BR 165 is not asserted), the main on signal MAIN_ON 164 substantially follows on signal ON 160.

The branch switch 152 and diode D2 154 is shown as coupled between the bypass capacitor 144 and the intermediate node A 117 of power switch S1 114. The branch current $I_{BR}$ 168 is the current conducted by the branch switch 152. For the example shown, one end of branch switch 152 is coupled to the intermediate node A 117 of the power switch S1 114 while the other end is coupled to the anode of diode D2 154. Cathode of diode D2 154 is coupled to the bypass capacitor 144. Diode D2 is utilized to prevent current from flowing from the bypass capacitor 144 to the power switch S1 114. However, it should be appreciated that other configurations of the branch switch 152 and diode D2 154 could be utilized. As shown, the sum of the branch current $I_{BR}$ 168 and the second switch current $I_1$ 120 is substantially the drain current $I_D$ 119, or mathematically: $I_D=I_{BR}+I_1$.

In operation, the branch control 150 outputs the branch drive signal BR 165 to turn ON branch switch 152 when the bypass regulation signal BP_REG 163 indicates that the bypass voltage VBP 142 has fallen below reference REF 167. If the bypass regulation signal BP_REG 163 indicates that the bypass voltage VBP 142 has not fallen below reference REF 167, branch switch 152 is not turned ON, and the main on signal MAIN_ON 164 is substantially the on signal ON 160.

If the bypass regulation signal BP_REG 163 indicates that the bypass voltage VBP 142 has fallen below reference REF 167, the branch control 150 synchronizes turning on the branch switch 152 with the ON signal. As will be further shown with respect to FIG. 2, if the bypass voltage VBP 142 falls below the reference REF 167 during a switching cycle of the power switch S1 114, the branch switch 152 is turned on at the start of the next (or subsequent) switching cycle. In one embodiment, the branch switch 152 is turned ON for as long as the on signal ON 160 is asserted or until the bypass voltage VBP 142 reaches the reference REF 167. The on signal ON 160 may be deasserted when the drain current $I_D$ 119 reaches a current limit and as such the branch switch 152 is ON until the drain current $I_D$ 119 reaches a current limit or until the bypass voltage VBP 142 reaches the reference REF 167. In another embodiment, the branch switch 152 may turn on for a fixed amount of time. Further, if the branch switch 152 turns OFF before the on signal ON 160 is deasserted, the main on signal MAIN_ON 164 is asserted and subsequently follows the on signal ON 160 to turn ON the power switch S1 114. The main on signal MAIN_ON 164 is deasserted when the on signal ON 160 is deasserted. For the example shown in FIG. 1, the branch current $I_{BR}$ 168 is substantially equal to the drain current $I_D$ 119 when branch switch 152 is conducting.

Driver 158 is configured to receive the branch drive signal BR 165, main on signal MAIN_ON 158, and the off signal OFF 162 and outputs the primary drive signal DR 138 to control the conduction of the power switch S1 114. In particular, the primary drive signal DR 138 controls the conduction of the second switch 118 of the cascode power switch S1 114. For example, driver 158 can control the conduction and the amount of current conducted by the second switch 118. In operation, in response to an asserted branch drive signal BR 165, the driver 158 outputs the primary drive signal DR 138 such that the second switch 118 is OFF, or not conducting. If the main on signal MAIN_ON 164 is asserted, driver 158 outputs the primary drive signal DR 138 such that the second switch 118 is ON, or conducting. If the off signal OFF 162 is asserted, the driver 158 outputs the primary drive signal DR 138 such that the second switch 118 is OFF, or not conducting. For the example shown, when second switch 118 is conducting, the second switch current $I_1$ 120 is substantially the drain current $I_D$ 119.

As such, the first controller 132 utilizes at least a portion of the current conducted by the first switch 116 (e.g. at least a portion of the drain current $I_D$ 119) to charge the bypass capacitor 144, which provides operating power to the first controller 132. For the example shown in FIG. 1, the branch switch 152 is turned on and directs the entire drain current $I_D$ 119 to charge the bypass capacitor 144. In other words, when the branch switch 152 is turned on, the branch current $I_{BR}$ 168 is substantially equal to the drain current $I_D$ 119. Further, there are energy savings since the power switch S1 114 is a cascode device with a normally-on transistor (first switch 116) and normally-off transistor (second switch 118). Previously solutions could have used a normally-off transistor as the power switch, such as a bipolar-junction transistor (BJT). The normally-off transistor (e.g. BJT) would need a higher voltage power source to keep the normally-off transistor conducting or alternatively the base-emitter capacitance (or gate-source capacitance) would be precharged, to allow any energy to flow through a branch switch to the bypass capacitor. Further, for a BJT, turn-on and turn-off transistors would also be utilized. However, since the power switch S1 114 is a cascode device with both a normally-on and normally-off device, no higher voltage power voltage power source or charging of the gate-source or base-emitter capacitance is necessary.

Figure 2:
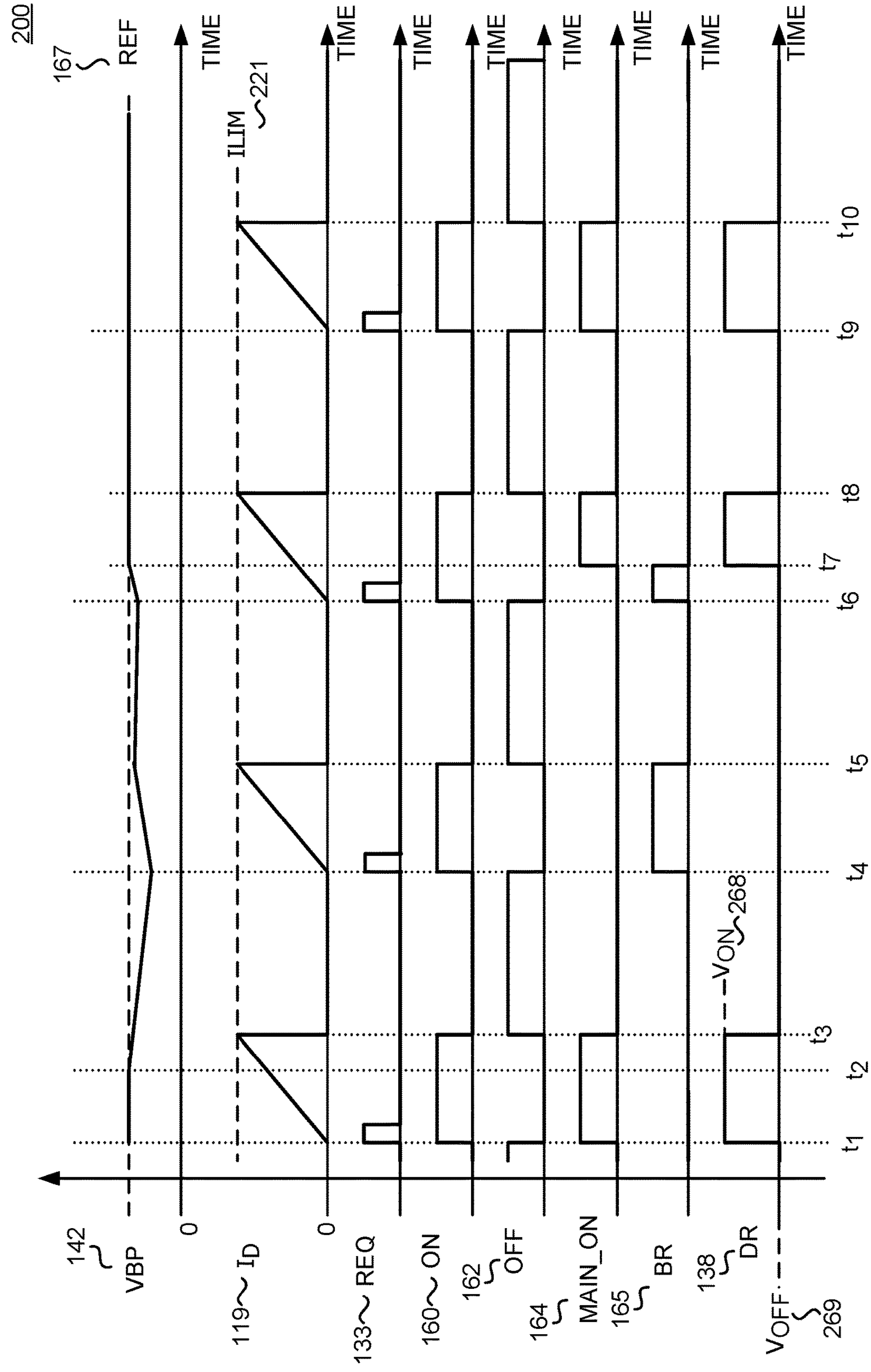
FIG. 2 is a timing diagram illustrating example waveforms of the power converter and controller with the branch switch and branch control of FIG. 1, in accordance with embodiments of the present disclosure.

FIG. 2 illustrates diagram 200 with example waveforms of the bypass voltage VBP 142, drain current $I_D$ 119, request signal REQ 133, on signal ON 160, off signal OFF 162, main on signal MAIN_ON 163, branch drive signal BR 165, and primary drive signal DR 138 for the power converter 100 of FIG. 1. It should be appreciated that similarly named and numbered elements couple and function as described above. For the waveforms of FIG. 2, the first controller 132 turns ON the power switch S1 114 or the branch switch 152 when a request event in the request signal REQ 133 is received and turns OFF the power switch S1 114 when the drain current $I_D$ 119 reaches a current limit ILIM 221. The first controller 132 turns ON the branch switch 152 in response to the sensed bypass voltage VBP 142.

At time $t_1$, a request event (e.g. pulse) is received in the request signal REQ 133, and the on signal ON 160 is asserted to turn ON the power switch S1 114. Since the bypass voltage VBP 142 is substantially equal to the reference REF 167 at time $t_1$, the main on signal MAIN_ON 164 substantially follows the on signal ON 160 and the primary drive signal DR 138 is provided to turn ON the power switch S1 114. As shown, the primary drive signal DR 138 transitions to an on voltage $V_{ON}$ 268, which is the voltage to turn on the device utilized for the second switch 118 such that the second switch current $I_1$ 120 conducted by the second switch 118 is determined by the components coupled to the second switch 118. Further, the branch drive signal BR 165 is not asserted, and the branch switch 152 is not conducting.

Between time $t_1$ and $t_3$, the drain current $I_D$ 119 increase at a rate proportional to the input voltage $V_{IN}$ 102 divided by the inductance of the input winding 108. Further the power converter 100 is operating in discontinuous conduction mode (DCM) as shown by the drain current $I_D$ 119. Since the branch switch 152 is not conducting, the second switch current $I_1$ 120 is substantially equal to the drain current $I_D$ 119 and the branch current $I_{BR}$ 168 is substantially zero. At time $t_3$, the drain current $I_D$ 119 reaches the current limit ILIM 221 and the first controller 132 turns OFF the power switch S1 114. As such, the on signal ON 160 and the main on signal MAIN_ON 164 are deasserted (transitions to a logic low value) and the off signal OFF 162 is asserted (transitions to a logic high value). The primary drive signal DR 138 transitions to the off voltage $V_{OFF}$ 269, which is the voltage for the device utilized for the second switch 118 such that the second switch 118 and the power switch S1 114 cannot conduct current (e.g turned off). Once the second switch 118 is off, the drain current $I_D$ 119 falls to zero.

However, at time $t_2$ the bypass voltage VBP 142 falls below the reference REF 167. During the next switching cycle of the power switch S1 114 at time $t_4$, the branch switch 152 is turned ON to charge the bypass capacitor 144 and the bypass voltage VBP 142 increases. After time $t_2$, the bypass voltage VBP 142 continues to decrease until the branch switch 152 is turned on at time $t_4$.

At time $t_4$, another request event is received in request signal REQ 133 and the bypass voltage VBP 142 is less than the reference REF 167. Main control 148 asserts the on signal ON 160 and deasserts the off signal OFF 162 while branch control 150 asserts the branch drive signal BR 165. Since the branch drive signal BR 165 is asserted, the main on signal MAIN_ON 164 does not follow the on signal ON 160 and main on signal MAIN_ON 164 remains deasserted and the primary drive signal DR 138 remains at the off voltage $V_{OFF}$ 269. The branch switch 152 is turned ON (e.g. conducts current) and the second switch 118 is prevented from conducting current (e.g. turned OFF). The drain current $I_D$ 119 increases and the branch switch 152 conducts the entire drain current $I_D$ 119 to charge the bypass capacitor 144 and the bypass voltage VBP 142 increases. Or in other words, the branch current $I_{BR}$ 168 is substantially equal to the drain current $I_D$ 119 while the second switch current $I_1$ 120 is substantially zero.

At time $t_5$, the drain current $I_D$ 119 reaches the current limit ILIM 221 and main control 148 deasserts the on signal ON 160 and asserts the off signal OFF 162. Branch control 150 deasserts the branch drive signal BR 165 to turn OFF the branch switch 152. Further, off signal OFF 162 is received by the driver 158 and the primary drive signal DR 138 remains at the off voltage $V_{OFF}$ 269 to prevent the second switch 118 from conducting and the drain current $I_D$ 119 reduces to zero. However as shown, the bypass voltage VBP 142 is still below the reference REF 167 and between times $t_5$ and $t_6$, the bypass voltage VBP 142 is decreasing.

At time $t_6$, another request event is received in request signal REQ 133 and main control 148 asserts the on signal ON 160 and deasserts the off signal OFF 162. The bypass voltage VBP 142 is still below the reference REF 167 and as such, branch control 150 asserts the branch drive signal BR 165 to turn ON the branch switch 152 and main on signal MAIN_ON remains deasserted to prevent the second switch 118 from turning ON. The branch switch 152 conducts the drain current $I_D$ 119 to charge bypass capacitor 144 and the bypass voltage VBP 142 increases. Between times $t_0$ and $t_7$, the branch current $I_{BR}$ 168 is substantially equal to the drain current $I_D$ 119 while the second switch current $I_1$ 120 is substantially zero.

As shown in FIG. 2, the bypass voltage VBP 142 reaches the reference REF 167 at time $t_7$ prior to the drain current $I_D$ 119 reaching the current limit ILIM 221 at time $t_8$. At time $t_7$, branch control 150 deasserts the branch drive signal BR 165 to prevent the branch switch 152 from conducting and asserts the main on signal MAIN_ON 164 to turn ON the second switch 118. In other words, branch control 150 allows the main on signal MAIN_ON 164 to follow the on signal ON 160. Driver 158 receives the asserted main on signal MAIN_ON 164 and transitions the primary drive signal DR 138 to the on voltage $V_{ON}$ 268 to turn on the second switch 118 such that the second switch 118 conducts the drain current $I_D$ 119. Between times $t_7$ and $t_8$, the second switch current $I_1$ 120 is substantially equal to the drain current $I_D$ 119 and the branch current $I_{BR}$ 168 is substantially zero.

At time $t_8$, the drain current $I_D$ 119 reaches the current limit ILIM 221 and main control 148 deasserts the on signal ON 160 and asserts (the off signal OFF 162. Further, the off signal OFF 162 is received by the driver 158 and the primary drive signal DR 138 transitions to the off voltage $V_{OFF}$ 269 to prevent the second switch 118 from conducting and the drain current $I_D$ 119 reduces to zero.

At time to, a request event is received in the request signal REQ 133 and main control 148 asserts the on signal ON 160 and deasserts the off signal OFF 162. Since the bypass voltage VBP 142 is substantially equal to the reference REF 167 at time $t_9$, and the main on signal MAIN_ON 164 substantially follows the on signal ON 160 and branch drive signal BR 165 remains deasserted. Driver 158 transitions the primary drive signal DR 138 to on voltage $V_{ON}$ 268 such that the second switch 118 can conduct the drain current $I_D$ 119. At time $t_{10}$, the drain current $I_D$ 119 reaches the current limit ILIM 221 and main control 148 deasserts the on signal ON 160 and asserts the off signal OFF 162 to turn OFF the second switch 118. The primary drive signal DR 138 transitions to the off voltage $V_{OFF}$ 269 to prevent the second switch 118 from conducting and the drain current $I_D$ 119 reduces to zero.

Figure 3:
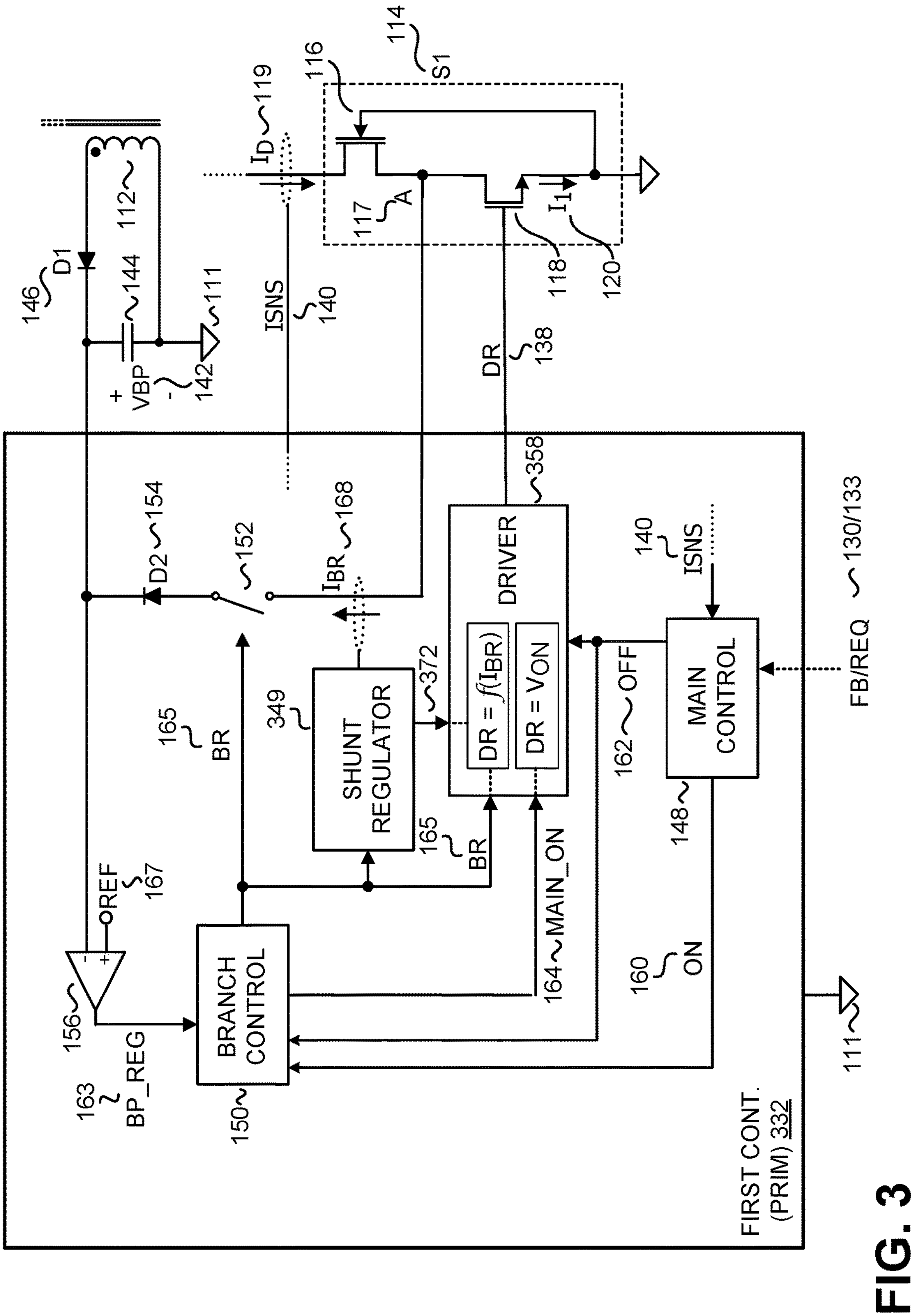
FIG. 3 is a functional block diagram of another example controller with a branch switch, a branch control, and a shunt regulator, in accordance with embodiments of the present disclosure.

FIG. 3 illustrates another embodiment of first controller 332 including main control 148, branch control 150, branch switch 152, diode D2 154, comparator 156, a driver 358 and a shunt regulator 349. Further shown in FIG. 3 are the power switch S1 114, which includes the first switch 116 and the second switch 118, the bypass capacitor 144, diode D1 146 and auxiliary winding 112. The power switch S1 114, the bypass capacitor 144, diode D1 146 and auxiliary winding 112 are included to provide context for the first controller 332 with regards to FIG. 1. The drain current $I_D$ 119, second switch current $I_1$ 120, feedback/request signal FB/REQ 130/133, primary drive signal DR 138, current sense signal ISNS 140, bypass voltage VBP 142, on signal ON 160, off signal OFF 152, bypass regulation signal BP_REG 163, main on signal MAIN_ON 164, branch drive signal BR 165, reference REF 167, branch current $I_{BR}$ 168, and shunt regulator output 372 are also illustrated in FIG. 3. It should be appreciated that the first controller 332 may be utilized with power converter 100 shown in FIG. 1.

FIG. 3 shares many similarities with the first controller 132 discussed with respect to FIG. 1, and it should be appreciated that similarly named and numbered elements couple and function as described above with respect to FIGS. 1 and 2. At least one difference, however, is the addition of the shunt regulator 349 with the shunt regulator output 372 and how the driver 358 responds to the shunt regulator output 372. Further, branch control 150 is also configured to receive the off signal OFF 162 from main control 148 and determines if a bypass voltage VBP 142 has fallen below the reference REF 167 during the off-time of power switch S1 114 to determine if the branch switch 152 should be turned on. However, it should be appreciated that branch control 150 could utilize the inverse of the on signal ON 160 rather than the off signal OFF 162.

In the embodiment shown, the first controller 332 controls the amount of branch current $I_{BR}$ 168 conducted by the branch switch 152. Further, the first controller 332 controls the amount of the branch current $I_{BR}$ 168 conducted by the branch switch 152 by controlling the magnitude of the second switch current $I_1$ 120 conducted by the second switch 118. In other words, the first controller 332 utilizes the second switch 118 to regulate the branch current $I_{BR}$ 168. Thus, the first controller 332 determines how much of the drain current $I_D$ 119 is redirected by the branch switch 152 to charge the bypass capacitor 144. The remaining drain current $I_D$ 119 not used to charge the bypass capacitor 144 is conducted by the second switch 118.

The physical size of the branch switch is partially determined by the maximum amount of branch current $I_{BR}$ 168 which the branch switch 152 conducts and the duration of time which the branch switch 152 conducts the maximum current. For example, for the branch switch 152 to be able to conduct the entirety of the drain current $I_D$ 119, the physical size of the branch switch 152 would be similar to the physical size of the second switch 118. Depending on the package used to house the first controller 332, and the second switch 118, there may not be enough space to house both the second switch 118 and branch switch 152 if the size of the branch switch 152 is similar to the size to the second switch 118. As such, the physical size of the branch switch 152 may be controlled by regulating the branch current $I_{BR}$ 168 to be less than a branch current threshold. A smaller branch switch 152 may be utilized if the second switch 118 is controlled to shunt a portion of the drain current $I_D$ 119 to regulate the branch current $I_{BR}$ 168 below a branch current threshold.

For the embodiment shown in FIG. 3, the branch control 150 outputs the branch drive signal BR 165 to turn on the branch switch 152 during a switching cycle if the bypass voltage VBP 142 is below the reference REF 167 prior to the start of the switching cycle. In one embodiment, the branch switch 152 remains ON until the bypass voltage VBP 142 rises above the reference REF 167 or the off signal OFF 162 is asserted. In another embodiment discussed with respect to FIGS. 5A and 5B, the branch switch 152 turns ON for a fixed amount of time or until the off signal OFF 162 is asserted. The branch control 150 receives the off signal OFF 162 and may determine to turn ON the branch switch 152 for the upcoming switching cycle if bypass voltage VBP 142 is below the reference REF 167 when the off signal OFF 162 is asserted. Alternatively, branch control 150 may utilize the on signal ON 160 and may determine to turn ON the branch switch 152 for the upcoming switching cycle if bypass voltage VBP 142 is below the reference REF 167 when the on signal ON 160 is not asserted. In one example, the off signal OFF 162 is asserted (or the on signal ON 160 is deasserted) when the drain current $I_D$ 119 reaches the current limit and remains asserted until the next request event is received in request signal REQ 133. When the off signal OFF 162 is asserted, the power switch S1 114 and branch switch 152 are turned OFF and prevented from conducting.

Shunt regulator 349 is configured to receive the branch drive signal BR 165 from branch control 150 and to sense the branch current $I_{BR}$ 168. The shunt regulator 349 outputs the shunt regulator output 372 to driver 358. In operation, the shunt regulator 349 senses the branch current $I_{BR}$ 168 when the branch drive signal BR 165 indicates that the branch switch 152 is ON (e.g. or conducting). Further, the shunt regulator 349 senses when the branch current $I_{BR}$ 168 has reached a branch current threshold and outputs the shunt regulator output 372. Along with the driver 358, the branch current $I_{BR}$ 168 is prevented from exceeding the branch current threshold. In one example, the shunt regulator output 372 may be a voltage which is regulated by the shunt regulator 349 to determine the level of the primary drive signal DR 138. In one example, the shunt regulator 349 functions like a linear amplifier.

Driver 358 is configured to receive the main on signal MAIN_ON 164, the branch drive signal BR 165 and the shunt regulator output 372. The main on signal MAIN_ON 164 is representative of turning on the second switch 118 to be fully ON. In response to an asserted main on signal MAIN_ON 164, the driver 358 outputs the drive signal DR 138 to a level such that the second switch 118 is fully on (e.g. on voltage $V_{ON}$). Or in other words, the current conducted by the second switch 118 is determined by external components coupled to the second switch 118.

The branch drive signal BR 165 is representative of conduction of the branch switch 152. In response to an asserted branch drive signal BR 165, the driver 358 determines the level of primary drive signal DR 138 in response to the shunt regulator output 372 representative of the branch current $I_{BR}$ 168 to control the value of second switch current $I_1$ 120 conducted by the second switch 118.

The driver 358 varies the level of the primary drive signal DR 138 to control the conduction of second switch 118 in response to the shunt regulator output 372 while the branch switch 152 is ON (e.g. conducting). The sum of the branch current $I_{BR}$ 168 and the second switch current $I_1$ 120 is substantially the drain current $I_D$ 119, or mathematically: $I_D = I_{BR} + I_1$. For the example shown, the second switch 118 is a voltage controlled device, illustrated as a MOSFET, and the primary drive signal DR 138 is a voltage signal. The driver 358 varies the voltage level of the primary drive signal DR 138 to control the value of the second switch current $I_1$ 120 conducted by the second switch 118. The voltage level of the primary drive signal DR 138 may be selected such that the value of second switch current $I_1$ 120 is determined by the gate-source voltage of second switch 118. In one example, the voltage level of the primary drive signal DR 138 may be selected such that the second switch 118 would be operating in the linear mode.

In another embodiment, the driver 358 is configured to receive the main on signal MAIN_ON 164 and the shunt regulator output 372 but not the branch drive signal BR 165. The main on signal MAIN_ON 164 is representative of turning ON the second switch 118 to fully turn ON the second switch 118 or to turn ON the second switch 118 in response to the shunt regulator output 372. As such, main on signal MAIN_ON 164 may be asserted to fully turn ON the second switch 118 when the branch switch 152 is not turned ON. The main on signal MAIN_ON 164 may also be asserted such that the driver 358 determines the level of primary drive signal DR 138 in response to the shunt regulator output 372 to control the value of second switch current $I_1$ 120 and regulate the branch current $I_{BR}$ 168 below the branch current threshold when branch switch 152 is ON.

As such, the shunt regulator 349 and driver 358 regulate the value of the branch current $I_{BR}$ 168 below the branch current threshold by controlling the amount of the drain current $I_D$ 119 which is conducted by the second switch 118 (e.g. second switch current $I_1$ 120). Or in other words, the shunt regulator 349 and driver 358 regulate the amount of drain current $I_D$ 119 which is used to charge the bypass capacitor 144 (e.g. branch current $I_{BR}$ 168). The remainder of the drain current $I_D$ 119 is conducted by second switch 118 as second current $I_1$ 120.

Further, the first controller 332 may vary the operation of the branch switch 152 and the second switch 118 when the power converter 100 is operating in discontinuous conduction mode (DCM) or continuous conduction mode (CCM). During DCM, the switch current $I_D$ 119 is zero when the power switch S1 114 or the branch switch 152 is turned ON. In CCM, the switch current $I_D$ 119 is substantially non-zero when the power switch S1 114 or the branch switch 152 is turned ON.

During DCM operation, if the bypass voltage VBP 142 is below the reference REF 167 when a switching cycle is requested (e.g. the on signal ON 160 is asserted), the branch drive signal BR 165 controls the branch switch 152 ON (e.g. conducting). The shunt regulator 349 and driver 358 regulate the branch current $I_{BR}$ 168 by controlling how much second switch current $I_1$ 120 the second switch 118 conducts.

In CCM however, the drain current $I_D$ 119 is non-zero when the power switch S1 114 turns ON. As such, when the power switch S1 114 or branch switch 152 turns ON, a large current spike can occur. This large current spike could damage the branch switch 152. For the branch switch 152 to be able to conduct the entirety of the drain current $I_D$ 119, the physical size of the branch switch 152 could be similar to the physical size of the second switch 118. However, as mentioned above, a physically smaller branch switch 152 may be utilized by regulating the branch current $I_{BR}$ 168. In CCM operation, the second switch 118 is turned ON at the beginning of a switching cycle to conduct the large current spike prior to turning ON the branch switch 152. After a given amount of time, the branch switch 152 is then turned ON such that the branch current $I_{BR}$ 168 charges the bypass capacitor 144. The shunt regulator 349 and driver 358 regulate the branch current $I_{BR}$ 168 by controlling how much second switch current $I_1$ 120 the second switch 118 conducts. As such, the second switch 118 is utilized to protect the branch switch 152.

Figure 4A:
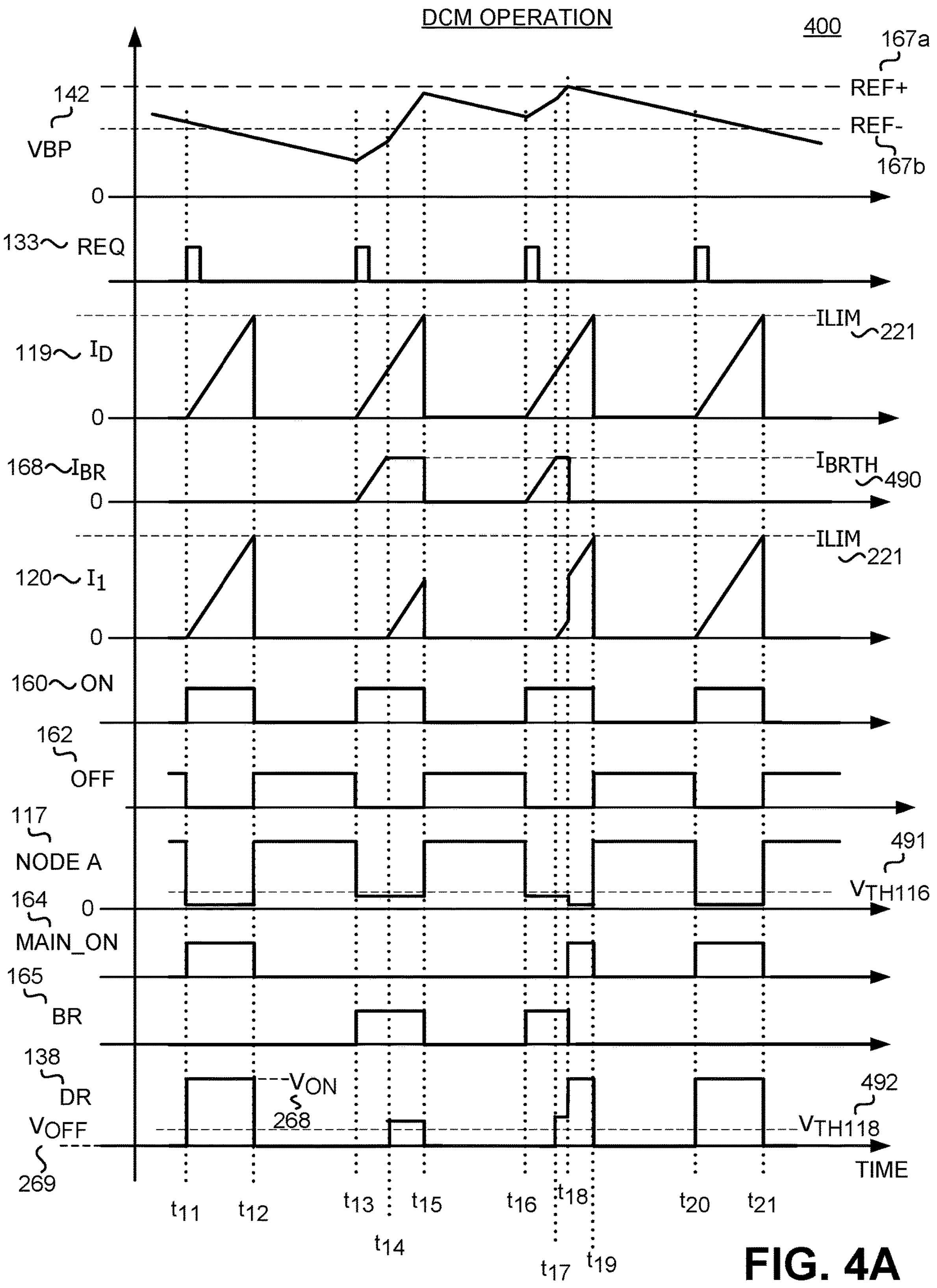
FIG. 4A is a timing diagram illustrating example waveforms of the controller with branch switch, branch control, and shunt regulator of FIG. 3 when the power converter is operating in discontinuous conduction mode (DCM), in accordance with embodiments of the present disclosure.

FIG. 4A is a timing diagram 400 illustrating example waveforms of the first controller 332 of FIG. 3 when the power converter 100 is operating in discontinuous conduction mode (DCM). The bypass voltage VBP 142, request signal REQ 133, drain current $I_D$ 119, branch current $I_{BR}$ 168, second current $I_1$ 120, on signal ON 160, off signal OFF 162, the voltage at node A 117, main on signal MAIN_ON 164, branch drive signal BR 165, and primary drive signal DR 138 are illustrated. Similar to FIG. 2, the primary drive signal DR 138 is shown as a voltage signal and the voltage level of the primary drive signal DR 138 controls the value of second switch current $I_1$ 120. It should be appreciated that similarly named and numbered elements couple and function as described above.

Figure 4B:
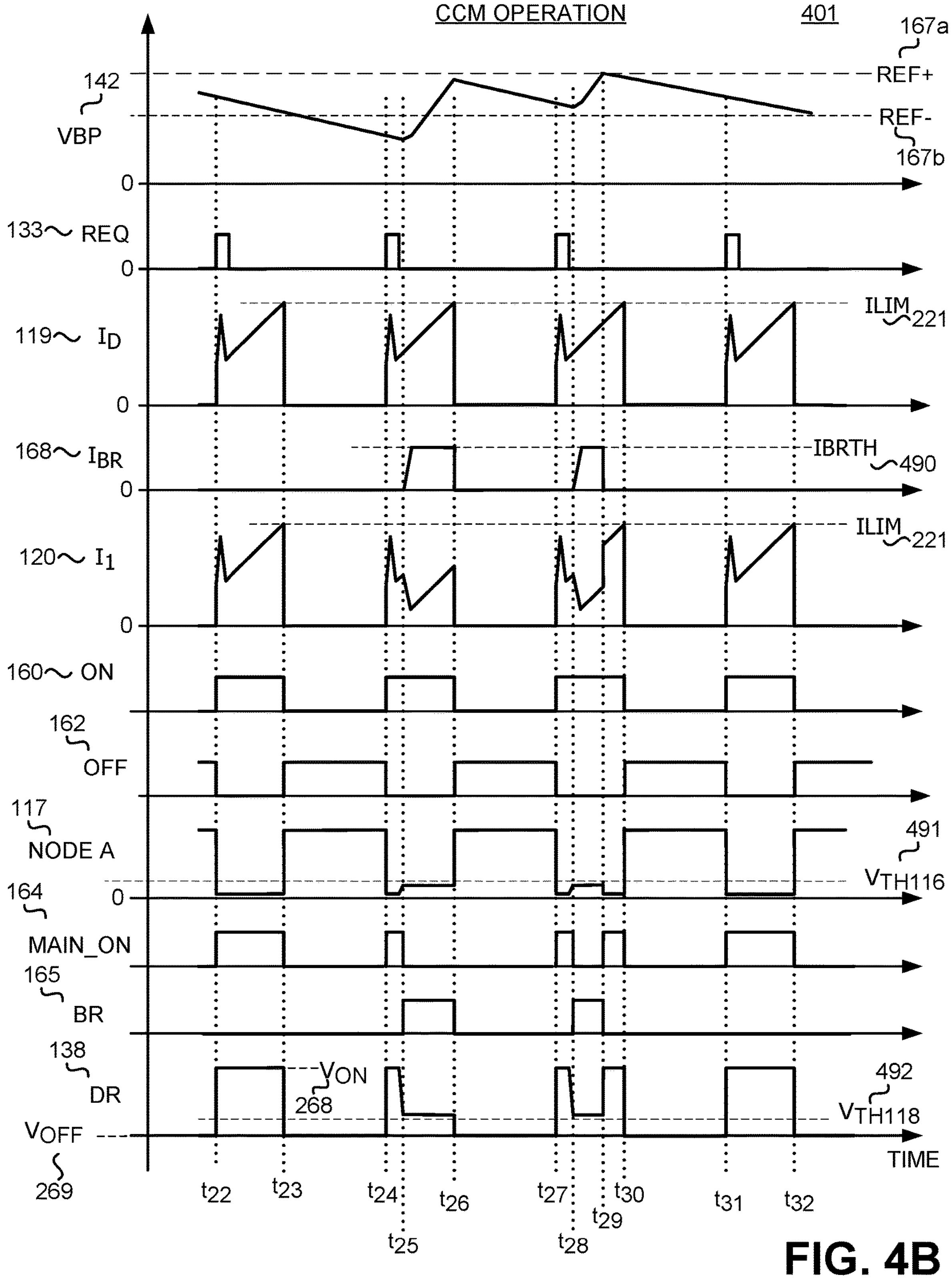
FIG. 4B is a timing diagram illustrating example waveforms of the controller with branch switch, branch control, and shunt regulator of FIG. 3 when the power converter is operating in continuous conduction mode (CCM), in accordance with embodiments of the present disclosure.

In the example shown, comparator 156 utilizes hysteresis and the upper reference REF+ 167*a* and lower reference REF− 167*b* illustrated in FIGS. 4A and 4B represent the hysteresis thresholds for reference REF 167. The bypass regulation signal BP_REG 163 transitions to a logic high value when the bypass voltage VBP 142 falls below the lower reference REF− 167*b* and transitions to a logic low value when the bypass voltage VBP 142 exceeds the upper reference REF+ 167*a*. In other words, the first controller 332 may determine to turn ON the branch switch 152 to charge the bypass capacitor 144 when the bypass voltage VBP 142 falls below the lower reference REF− 167*b*. Controller 332 may also determine to turn OFF the branch switch 152 when the bypass voltage VBP 142 exceeds the upper reference REF+ 167*a*.

Between times $t_{11}$ to $t_{13}$ and $t_{20}$ onward represent normal switching cycles of the power switch S1 114 in which the second switch 118 is fully turned ON and energy is transferred from the input to the output of the power converter 100. However, the switching cycles between times $t_{13}$ to $t_{16}$ and times $t_{16}$ to $t_{20}$ represent charging cycles in which the branch switch 152 is turned ON to charge the bypass capacitor 144. During these cycles, the second switch 118 is utilized to regulate the branch current $I_{BR}$ 168 below the branch current threshold $I_{BRTH}$ 490. Although, it should be appreciated that the switching cycle between times $t_{16}$ to $t_{20}$ transitions from a charging cycle to a normal switching cycle.

At time $t_{11}$, a request event (e.g. pulse) is received in the request signal REQ 133 and the on signal ON 160 is asserted while the off signal OFF 162 is deasserted by main control 148. Bypass voltage VBP 142 is greater than the lower reference REF− 167*b* when the request event is received and as such, the branch switch 152 is not turned ON to charge the bypass capacitor 144. Branch control 150 asserts the main on signal MAIN_ON 164 such that the main on signal MAIN_ON 164 substantially follows the on signal ON 160. The branch drive signal BR 165 is also not asserted by branch control 150 and branch switch 152 does not conduct, indicated by the substantially zero branch current $I_{BR}$ 168 between times $t_{11}$ and $t_{12}$.

With the main on signal MAIN_ON 164 asserted, the primary drive signal DR 138 provided by driver 358 is substantially the on voltage $V_{ON}$ 268, which is the voltage to turn on the second switch 118 such that the drain current $I_D$ 119 and the second current $I_1$ 120 are determined by the components coupled to the power switch S1 104. As such, between times $t_{11}$ and $t_{12}$, the second switch 118 is fully ON and the voltage at node A 117 is a small near-zero value. In one example, the voltage at node A 117 when the second switch 118 is fully ON may be substantially 100 mV. The second switch 118 is conducting and the second current $I_1$ 120 is substantially equal to the drain current $I_D$ 119.

At time $t_{12}$, the drain current $I_D$ 119 reaches the current limit ILIM 221 and the power switch S1 114 is turned OFF. Both on signal ON 160 and main on signal MAIN_ON 164 are deasserted while the off signal OFF 162 is asserted. The driver 358 transitions the drive signal DR 138 to the off voltage $V_{OFF}$ 269, which is the voltage value such that the second switch 118 cannot conduct current and the drain current $I_D$ 119 and second current $I_1$ 120 fall to zero. Between times $t_{12}$ and $t_{13}$, when the power switch S1 114 is OFF, the voltage at node A 117 is at a high value above the threshold $V_{TH116}$ 491 of the first switch 116 such that the first switch 116 is in cutoff and does not conduct current.

At time $t_{13}$, a request event is received in the request signal REQ 133 and the on signal ON 160 is asserted while the off signal OFF 162 is deasserted. In addition, the bypass voltage VBP 142 is below the lower reference REF− **167*b* and as such at least a portion of the drain current $I_D$ 119 is utilized to charge the bypass capacitor 144. Since the bypass voltage VBP 142 has fallen below the lower reference REF− 167*b*, branch control 150 does not assert the main on signal MAIN_ON 164 and instead asserts the branch drive signal BR 165 to turn ON the branch switch 152 and conduct the branch current $I_{BR}$ 168. The primary drive signal DR 138 remains at the off voltage $V_{OFF}$ 269 to prevent the second switch S1 118 from conducting. At time $t_{13}$, the voltage at node 117 falls to a value above input return 111 (shown as 0 V in FIGS. 4A and 4B) but below the threshold $V_{TH116}$ 491 of the first switch 116**.

Between times $t_{13}$ and $t_{14}$, the branch current $I_{BR}$ 168 is less than the branch current threshold $I_{BRTH}$ 490. As such, the primary drive signal DR 138 remains at the off voltage $V_{OFF}$ 269 and the second switch 118 does not conduct. The branch current $I_{BR}$ 168 is substantially the drain current $I_D$ 119 and the second current $I_1$ 120 is substantially zero.

At time $t_{14}$, however, the branch current $I_{BR}$ 168 reaches the branch current threshold $I_{BRTH}$ 490 and the shunt regulator 349 provides the shunt regulator output 372 such that the driver 358 controls second switch 118 ON and controls the amount of current the second switch 118 conducts (e.g. second current $I_1$ 120). As shown, at time $t_{14}$, the primary drive signal DR 138 transitions to a value above the threshold $V_{TH118}$ 492 of the second switch 118 such that the current conducted by the second switch 118 (e.g. second current $I_1$ 120) is dependent on the value of the gate voltage of the second switch 118 (e.g. the primary drive signal DR 138). As such, shunt regulator 349 is able to regulate the branch current $I_{BR}$ 168 at or below the branch current threshold $I_{BRTH}$ 490.

Between times $t_{14}$ and $t_{15}$, the shunt regulator 349 and driver 358 are controlling the conduction of second switch 118 such that the branch current $I_{BR}$ 168 remains at the branch current threshold $I_{BRTH}$ 490. The remaining drain current $I_D$ 119 that is not redirected to the bypass capacitor 144 by the branch switch 152 is conducted by the second switch 118 as second current $I_1$ 120. It should be appreciated that the sum of the second current $I_1$ 120 and branch current $I_{BR}$ 168 is substantially the drain current $I_D$ 119. Between times $t_{14}$ and $t_{15}$, the bypass voltage VBP 142 has increased above lower reference REF− **167*b* but has not reached the upper reference REF+ 167*a*. As such, the output of comparator 156 (e.g. bypass regulation signal BP_REG 163) does not change states until the bypass voltage VBP 142 has reached the upper reference REF+ 167*a* and the branch switch 152 remains ON to charge the bypass capacitor 144**.

At time tis, the drain current $I_D$ 119 reaches the current limit ILIM 221 and the power switch S1 114 is turned off. The on signal ON 160 is deasserted while the off signal OFF 162 is asserted. The driver transitions the drive signal DR 138 to the off voltage $V_{OFF}$ 269 and the voltage at node A 117 is at a high value above the threshold $V_{TH116}$ of the first switch 116. As such, both the first switch 116 and second switch 118 are not conducting and the drain current $I_D$ 119, second current $I_1$ 120, and branch current $I_{BR}$ 168 fall to zero. The bypass voltage VBP 142 has not reached the upper reference REF+ **167*a*** prior to time tis.

At time $t_{16}$, a request event is received and the bypass voltage VBP 142 is below the upper threshold REF+ **167*a*. As such, a portion of the drain current $I_D$ 119 is utilized to charge the bypass capacitor 144. The on signal ON 160 is asserted while the off signal OFF signal 162 is deasserted. Branch control 150 does not assert the main on signal MAIN_ON 164 and asserts the branch drive signal BR 165 to turn ON the branch switch 152 to conduct branch current $I_{BR}$ 168. The primary drive signal DR 138 remains at the off voltage $V_{OFF}$ 269 to prevent the second switch S1 118 from conducting. The voltage at node 117 falls to a value above input return 111 (shown as 0 V in FIGS. 4A and 4B) but below the threshold $V_{TH116}$ 491 of the first switch 116**.

Similar to the duration between times $t_{13}$ and $t_{14}$, between times $t_{16}$ and $t_{17}$ the branch current $I_{BR}$ 168 is less than the branch current threshold $I_{BRTH}$ 490. As such, the second switch 118 is not turned ON to conduct current and the branch current $I_{BR}$ 168 is substantially the drain current $I_D$ 119 and the second current $I_1$ 120 is substantially zero.

At time $t_{17}$, the branch current $I_{BR}$ 168 reaches the branch current threshold $I_{BRTH}$ 490 and the shunt regulator 349 and driver 358 control the second switch 118 ON. Further the amount of current (e.g. second current $I_1$ 120) the second switch 118 conducts is a function of the sensed branch current $I_{BR}$ 168. As shown, at time $t_{17}$ the primary drive signal DR 138 transitions to a value above the threshold $V_{TH118}$ 492 of the second switch 118 such that the current conducted by the second switch 118 (e.g. second current $I_1$ 120) is dependent on the value of the gate voltage of the second switch 118 (e.g. the primary drive signal DR 138).

Between times $t_{17}$ and $t_{18}$, the shunt regulator 349 and driver 358 are controlling the conduction of second switch 118 such that the branch current $I_{BR}$ 168 remains at the branch current threshold $I_{BRTH}$ 490. The remaining drain current $I_D$ 119 not utilized by the branch switch 152 to charge bypass capacitor 144 is conducted by the second switch 118 as second current $I_1$ 120. It should be appreciated that the sum of the second current $I_1$ 120 and branch current $I_{BR}$ 168 is substantially the drain current $I_D$ 119.

At time $t_{18}$, the bypass voltage VBP 142 reaches the upper reference REF+ **167*a* before the drain current $I_D$ 119 has reached the current limit ILIM 221. The on signal ON 160 is still asserted and branch control 150 deasserts the branch drive signal BR 165 to turn OFF the branch switch 152 and asserts the main on signal MAIN_ON 164 to fully turn ON the second switch 118. The cycle resumes to a normal switching cycle and the second switch 118 conducts the entirety of the drain current $I_D$ 119. Or in other words, the second current $I_1$ 120 is substantially the drain current $I_D$ 119. The voltage at node A 117 falls to a value well below the threshold $V_{TH116}$ 491 of the first switch 116 and the primary drive signal DR 138 increases to the on voltage $V_{ON}$ 268**.

At time $t_{19}$, the drain current $I_D$ 119 reaches the current limit ILIM 221 and the power switch S1 114 is turned off. Main control 148 deasserts the on signal ON 160 and asserts the OFF signal 162. Main on signal MAIN_ON 164 is also deasserted while the off signal OFF 162. The driver 358 transitions the drive signal DR 138 to the off voltage $V_{OFF}$ 269 and the voltage at node A 117 is at a high value above the threshold $V_{TH116}$ 491 of the first switch 116. As such, both the first switch 116 and second switch 118 are not conducting and the drain current $I_D$ 119, second current $I_1$ 120, and branch current $I_{BR}$ 168 fall to zero. The power switch S1 114 remains off until another request event is received in the request signal REQ 133 at time $t_{20}$.

FIG. 4B is a timing diagram 401 illustrating example waveforms of the first controller 332 of FIG. 3 when the power converter 100 is operating in continuous conduction mode (CCM). The bypass voltage VBP 142, request signal REQ 133, drain current $I_D$ 119, branch current $I_{BR}$ 168, second current $I_1$ 120, on signal ON 160, off signal OFF 162, the voltage at node A 117, main on signal MAIN_ON 164, branch drive signal BR 165, and primary drive signal DR 138 are illustrated. Further the upper reference REF+ 167*a* and lower reference REF− 167*b* illustrated in FIGS. 4A and 4B represent the hysteresis thresholds for reference REF 167 utilized by the comparator 156. It should be appreciated that similarly named and numbered elements couple and function as described above.

Between times $t_{22}$ to $t_{23}$ and $t_{31}$ onward represent normal switching cycles of the power switch S1 114 in which the second switch 118 is fully turned ON and energy is transferred from the input to the output of the power converter 100. However, the switching cycles between times $t_{24}$ to $t_{27}$ and times $t_{27}$ to $t_{31}$ represent charging cycles in which the branch switch 152 is turned ON to charge the bypass capacitor 144. During these cycles, the second switch 118 is also utilized to regulate the branch current $I_{BR}$ 168 below the branch current threshold $I_{BRTH}$ 490. Charging cycles begin when the bypass voltage VBP 142 falls below the lower reference REF− 167*b* and end when the bypass voltage VBP 142 reaches the upper reference REF+ 167*a*.

Similar to the normal switching cycles discussed above between times $t_{11}$ to $t_{13}$, and at time $t_{22}$ with respect to FIG. 4A, at time $t_{22}$ and time $t_{31}$, the bypass voltage VBP 142 is greater than the lower reference REF− 167*b* or has reached the upper reference REF+ 167*a* when a request event (e.g. pulse) is received in the request signal REQ 133 and the branch switch 152 is not turned ON to charge the bypass capacitor 144. The on signal ON 160 is asserted while the off signal OFF 162 is deasserted by main control 148. Branch control 150 asserts the main on signal MAIN_ON 164 and the main on signal MAIN_ON 164 substantially follows the on signal ON 160. The branch drive signal BR 165 is also not asserted by branch control 150 and branch switch 152 does not conduct, indicated by the substantially zero branch current $I_{BR}$ 168 between times $t_{22}$ and $t_{23}$ and $t_{31}$ onward The primary drive signal DR 138 is substantially equal to the on voltage $V_{ON}$ 268, which is the voltage to turn ON the second switch 118 such that the drain current $I_D$ 119 and the second current $I_1$ 120 are determined by components coupled to the power switch S1 104. As such, between times $t_{22}$ and $t_{23}$ and $t_{31}$ onward, the second switch 118 is fully ON and the voltage at node A 117 is a small near-zero value. For example, the voltage at node A 117 when the second switch 118 is fully on may be substantially 100 mV. When the second switch 118 is fully ON and conducting the second current $I_1$ 120 is substantially equal to the drain current $I_D$ 119. As shown, the drain current $I_D$ 119 is substantially non-zero at the beginning of the switching cycle, indicating CCM operation. A current spike is visible when the power switch S1 114 is turned on at time $t_{22}$ and time $t_{31}$ At times $t_{23}$ and $t_{32}$, the drain current $I_D$ 119 reaches the current limit ILIM 221 and the power switch S1 114 is turned OFF. Both on signal ON 160 and main on signal MAIN_ON 164 are deasserted while the off signal OFF 162 is asserted. The driver transitions the drive signal DR 138 to the off voltage $V_{OFF}$ 269, which is the voltage value such that the second switch 118 cannot conduct current and the drain current $I_D$ 119 and second current $I_1$ 120 fall to zero. Between times $t_{23}$ and $t_{24}$, when the power switch S1 114 is OFF, the voltage at node A 117 is at a high value above the threshold $V_{TH116}$ 491 of the first switch 116 such that the first switch 116 is in cutoff and does not conduct current.

At time $t_{24}$, a request event is received in the request signal REQ 133 and main control 148 asserts the on signal ON 160 and deasserts the OFF signal 162. However, at time $t_{24}$ the bypass voltage VBP 142 is below the lower reference REF− 167*b* and a portion of the drain current $I_D$ 119 is utilized to charge the bypass capacitor 144 by turning ON the branch switch 152. However, in CCM operation, the second switch 118 is fully turned ON momentarily between times $t_{24}$ and $t_{25}$ to conduct the CCM current spike seen at the beginning of the switching cycle. Branch control 150 asserts the main on signal MAIN_ON 164 but does not assert the branch drive signal BR 165 until time $t_{25}$. The primary drive signal DR 138 transitions to the on voltage $V_{ON}$ 268 and the voltage at node A 117 is a small near-zero value and the second switch 118 is fully ON and conducts the drain current $I_D$ 119 (e.g., the second current $I_1$ 120 is substantially the drain current $I_D$ 119).

At time $t_{25}$, branch control 150 asserts the branch drive signal BR 165 to turn ON the branch switch 152 and deasserts the main on signal MAIN_ON 164. The driver 358 transitions the primary drive signal DR 138 to a value above the threshold $V_{TH118}$ 492 of the second switch 118 such that the current conducted by the second switch 118 (e.g. second current $I_1$ 120) is dependent on the value of the gate voltage of the second switch 118 (e.g. the primary drive signal DR 138). As shown, the voltage at node A 117 transitions to a value below the threshold $V_{TH116}$ 491 of the first switch 116. It should be appreciated that the duration between times $t_{24}$ and $t_{25}$ may be a fixed or variable.

Between times $t_{25}$ and $t_{26}$, the branch current $I_{BR}$ 168 is less than or has reached the branch current threshold $I_{BRTH}$ 490. The shunt regulator 349 provides the shunt regulator output 372 to the driver 358 to control the amount of current the second switch 118 conducts (e.g. second current $I_1$ 120) such that the branch current $I_{BR}$ 168 remains at or below the branch current threshold $I_{BRTH}$ 490. The remaining drain current $I_D$ 119 not conducted by branch switch 152 to charge bypass capacitor 144 is conducted by the second switch 118 as second current $I_1$ 120. It should be appreciated that the sum of the second current $I_1$ 120 and branch current $I_{BR}$ 168 is substantially the drain current $I_D$ 119. During this switching cycle, the bypass voltage VBP 142 has increased above lower reference REF− 167*b* but has not reached the upper reference REF+ 167*a* and the output of comparator 156 (e.g. bypass regulation signal BP_REG 163) does not change states.

At time $t_{26}$, the drain current $I_D$ 119 reaches the current limit ILIM 221 and the power switch S1 114 is turned off. Both on signal ON 160 and main on signal MAIN_ON 164 are deasserted while the off signal OFF 162 is asserted. The driver transitions the drive signal DR 138 to the off voltage $V_{OFF}$ 269 and the voltage at node A 117 is at a high value above the threshold $V_{TH116}$ 491 of the first switch 116. As such, both the first switch 116 and second switch 118 are not conducting and the drain current $I_D$ 119, second current $I_1$ 120, and branch current $I_{BR}$ 168 fall to zero. With the branch switch 152 OFF, the bypass voltage VBP 142 decreases.

At time $t_{27}$, a request event is received in the request signal REQ 133 and main control 148 asserts the on signal ON 160 and deasserts the OFF signal 162. Bypass voltage VBP 142 is below the upper threshold REF+ 167*a* at time $t_{27}$ and a portion of the drain current $I_D$ 119 is utilized to charge the bypass capacitor 144. As previously discussed, the second switch 118 is fully turned ON momentarily between times $t_{27}$ and $t_{28}$ to conduct the CCM current spike seen at the beginning of the switching cycle. Branch control 150 asserts the main on signal MAIN_ON 164 but does not assert the branch drive signal BR 165 until time $t_{28}$. The primary drive signal DR 138 transitions to the on voltage $V_{ON}$ 268 and the voltage at node A 117 is a small near-zero value and the second switch 118 is fully ON and conducts the drain current $I_D$ 119 and as such the second current $I_1$ 120 is substantially the drain current $I_D$ 119.

At time $t_{28}$, branch control 150 asserts the branch drive signal BR 165 to turn on the branch switch 152 to conduct branch current $I_{BR}$ 168 and deasserts the main on signal MAIN_ON 164. The driver 358 transitions the primary drive signal DR 138 to a value above the threshold $V_{TH118}$ 492 of the second switch 118 such that the current conducted by the second switch 118 (e.g. second current $I_1$ 120) is dependent on the value of the gate voltage of the second switch 118 (e.g. the primary drive signal DR 138). As shown, the voltage at node A 117 transitions to a value just below the threshold $V_{TH116}$ 491 of the first switch 116. It should be appreciated that the duration between times $t_{27}$ and $t_{28}$ may be a fixed or variable.

Between times $t_{28}$ and $t_{29}$, the branch current $I_{BR}$ 168 is controlled to be less than the branch current threshold $I_{BRTH}$ 490. During this time period, the Shunt regulator 349 provides the shunt regulator output 372 to the driver 358 to control the amount of current the second switch 118 conducts (e.g. second current $I_1$ 120) such that the branch current $I_{BR}$ 168 remains at or below the branch current threshold $I_{BRTH}$ 490. The remaining drain current $I_D$ 119 not conducted by the branch switch 152 to charge the bypass capacitor 144 is conducted by the second switch 118 as second current $I_1$ 120.

At time $t_{29}$, the bypass voltage VBP 142 reaches the upper reference REF+ 167*a* before the drain current $I_D$ 119 has reached the current limit ILIM 221 and branch control 150 deasserts the branch drive signal BR 165 to turn OFF the branch switch 152. The on signal ON 160 is still asserted and branch control 150 then asserts the main on signal MAIN_ON 164 to fully turn ON the second switch 118. The voltage at node A 117 falls to a value well below the threshold $V_{TH116}$ 491 of the first switch 116 and the primary drive signal DR 138 increases to the on voltage $V_{ON}$ 268. The cycle resumes to a normal switching cycle and the second switch 118 conducts the entirety of the drain current $I_D$ 119 and the second current $I_1$ 120 is substantially the drain current $I_D$ 119.

At time $t_{30}$, the drain current $I_D$ 119 reaches the current limit ILIM 221 and the power switch S1 114 is turned off. Both on signal ON 160 and main on signal MAIN_ON 164 are deasserted while the off signal OFF 162 is asserted. The primary drive signal DR 138 transitions to the off voltage $V_{OFF}$ 269 and the voltage at node A 117 is at a high value above the threshold $V_{TH116}$ 491 of the first switch 116. As such, both the first switch 116 and second switch 118 are not conducting and the drain current $I_D$ 119, second current $I_1$ 120, and branch current $I_{BR}$ 168 fall to zero. The power switch S1 114 remains off until another request event is received in the request signal REQ 133 at time $t_{31}$.

Figure 5A:
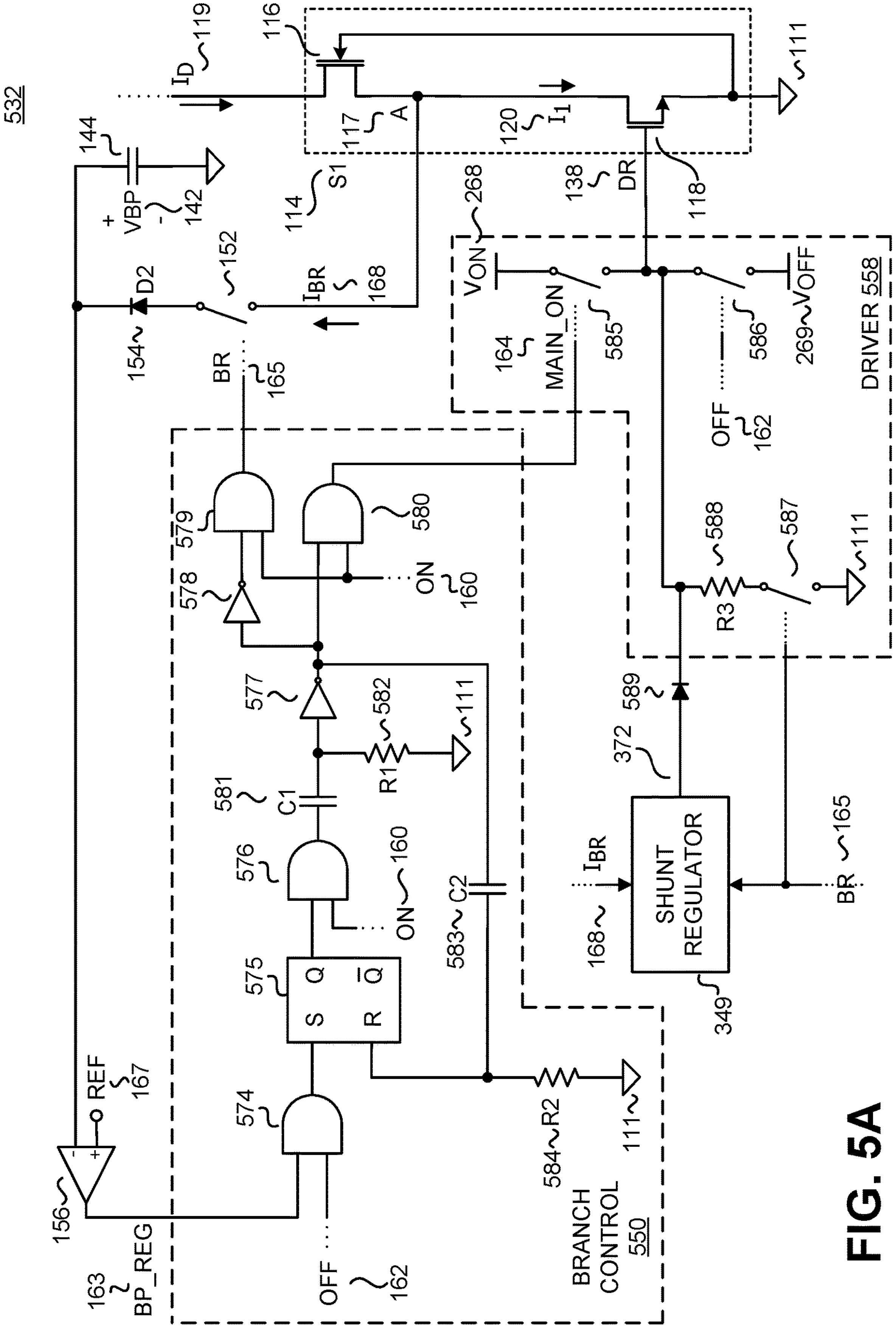
FIG. 5A is a schematic diagram of a further example controller with a branch switch, a branch control, and a shunt regulator, in accordance with embodiments of the present disclosure.

FIG. 5A illustrates another embodiment of first controller 532 including a branch control 550, branch switch 152, diode D2 154, comparator 156, a driver 558 and a shunt regulator 349. The power switch S1 114, which includes the first switch 116 and the second switch 118, and the bypass capacitor 144 are shown to provide context for the first controller 532 with regards to FIG. 1. The drain current $I_D$ 119, second switch current $I_1$ 120, primary drive signal DR 138, bypass voltage VBP 142, on signal ON 160, off signal OFF 152, bypass regulation signal BP_REG 163, main on signal MAIN_ON 164, branch drive signal BR 165, reference REF 167, branch current $I_{BR}$ 168, and shunt regulator output 372 are also illustrated in FIG. 5A. It should be appreciated that the first controller 532 may be utilized with power converter 100 shown in FIG. 1. Not illustrated in FIG. 5A is main control, however it should be appreciated that the first controller 532 also includes main control to provide the on signal ON 160 and the off signal OFF 162.

FIG. 5A illustrates example implementations of branch control 550 and driver 558. Branch control 550 is shown as including AND gate 574, latch 575, AND gate 576, capacitor C1 581, resistor R1 582, inverter 577, inverter 578, AND gate 579, and AND gate 580. Driver 558 is illustrated as including switches 585, 586, and 587, and resistor R3 588. For the example shown, diode 589 is illustrated as coupled between the shunt regulator 349 and driver 558 to illustrate the direction of shunt regulator output 372. It should be appreciated that diode 589 may be optional.

FIG. 5A shares many similarities with the first controller 132 discussed with respect to FIG. 1, and it should be appreciated that similarly named and numbered elements couple and function as described above with respect to FIGS. 1 and 2. At least one difference, however, is the addition of the shunt regulator 349 with the shunt regulator output 372 and how the driver 558 responds to the shunt regulator output 372. Similar to the first controller 332 discussed with respect to FIG. 3, the first controller 532 regulates the branch current $I_{BR}$ 168 at or below a branch current threshold $I_{BRTH}$.

FIG. 5A shares many similarities with first controller 332 with respect to FIG. 3, and it should be appreciated that similarly named and numbered elements couple and function as described above with respect to FIGS. 3, 4A, and 4B. At least one difference however, is the branch switch 152 is turned ON for a portion of the on-time of power switch S1 114 to charge the bypass capacitor 144. As will be discussed, if the bypass voltage VBP 142 is less than the reference REF 167, branch control 550 determines to turn ON the branch switch 152 for a period $T_1$ at the beginning of the on-time of the power switch S1 114. During the period $T_1$, the shunt regulator 349 and driver 558 regulate the branch current $I_{BR}$ 168 below a branch current threshold $I_{BRTH}$ by controlling the second current $I_1$ 120 conducted by second switch 118. Once the period $T_1$ has elapsed, the switching cycle resumes to a normal switching cycle and branch control 550 controls the branch switch 152 OFF and the driver 558 controls the second switch 118 fully ON to conduct the entirety of the drain current $I_D$ 119.

Branch control 550 determines if a bypass voltage VBP 142 has fallen below the reference REF 167 during the off-time of power switch S1 114, as indicated by the off signal OFF 162 (or alternatively the inverted on signal ON 160) and the bypass regulation signal BP_REG 163. Branch control 550 then determines if the branch switch 152 should be turned on such that a portion of the drain current $I_D$ 119 is used to charge the bypass capacitor 144. AND gate 574 is illustrated as coupled to comparator 156 and receives the bypass regulation signal BP_REG 163 and the off signal OFF 162. Alternatively, the AND gate 574 could receive the inverted on signal ON 160 rather than off signal OFF 162.

Latch 575 is coupled to AND gate 574. As shown the output of AND gate 574 is received at the S-input of latch 575. The reset-input of latch 575 is coupled to capacitor C2 583 and resistor R2 584. AND gate 576 is coupled to receive the Q-output of latch 575 and the on signal ON 160. The output of AND gate 576 is coupled to capacitance C1 581, which is then coupled to resistor R1 582 and inverter 577. Capacitance C1 581 and resistor R1 582 couple together as a monostable multivibrator to provide a pulse of duration $T_1$.

Inverter 577 is coupled to inverter 578 and AND gate 580. Both AND gates 579 and 580 are coupled to receive the on signal ON 160. Further AND gate 579 is coupled to receive the output of inverter 578 while AND gate 580 is coupled to receive the output of inverter 577. The output of AND gate 579 is the branch drive signal BR 165 while the output of AND gate 580 is the main on signal MAIN_ON 164.

In operation, if the bypass voltage VBP 142 is less than reference REF 167, the bypass regulation signal BP_REG 163 is a logic high value. The off signal OFF 162 is logic high (e.g. asserted) during the off-time of power switch S1 114. If the bypass regulation signal BP_REG 163 indicates the bypass voltage VBP 142 is less than reference REF 167 during the off-time of power switch S1 114, the output of AND gate 574 is logic high, the latch 575 is set, and the Q-output is a logic high value. The on signal ON 160 is logic high (e.g. asserted) at the beginning of the next switching cycle of power switch S1 114. Since the Q-output is high due to the bypass voltage VBP 142 being below the reference REF 167 in the previous switching cycle, the output of AND gate 576 is logic high. In other words, the output of AND gate 576 transitions to a logic high value with the leading edge of on signal ON 160. Capacitor C1 581 and resistor R1 582 couple together as a monostable multivibrator. When the output of AND gate 576 transitions to a logic high value (e.g. leading edge), capacitor C1 581 and resistor R1 582 provide a pulse with a duration substantially equal to period $T_1$.

Inverter 577 provides an inverted pulse of period $T_1$ to AND gate 580 while inverter 578 provides the pulse of period $T_1$ to AND gate 579. When the on signal ON 160 is initially asserted, the AND gate 579 provides a logic high (e.g. asserted) value for the branch drive signal BR 165 and branch switch 152 is turned ON for the period $T_1$. In other words, the branch drive signal BR 165 is logic high for a duration substantially equal to period $T_1$.

Since the inverter 577 provides an inverted pulse of period $T_1$ to AND gate 580, when the on signal ON 160 is initially asserted the main on signal MAIN_ON 164 is logic low (e.g. deasserted) for the period $T_1$. At the end of period $T_1$, the pulse provided by capacitor C1 581 and resistance R1 582 transitions to a logic low value and the branch drive signal BR 165 is deasserted (e.g. logic low) and branch switch 152 is turned OFF. The output of inverter 577 is logic high after period $T_1$, as such the main on signal MAIN_ON 164 transitions to a logic high value (e.g. asserted) after the period $T_1$ has elapsed and remains asserted to turn ON the second switch S1 118 until the on signal ON 160 is deasserted. Capacitor C2 583 and resistor R2 584 provides an edge trigger to reset the latch 575.

If the bypass regulation signal BP_REG 163 remains logic low, indicating that the bypass voltage VBP 142 is greater than reference REF 167, the latch 575 is not set and it's Q-output is logic low, AND gate 576 is logic low while inverter 577 is logic high and inverter 578 is logic low. As such, the branch drive signal BR 165 remains logic low (e.g. deasserted) and the main on signal MAIN_ON 164 is logic high (e.g. asserted) when the on signal ON 160 is logic high (e.g. asserted).

Driver 558 is illustrated as including switches 585, 586, and 587, and resistor R3 588. Diode 589 is illustrated as coupled between the shunt regulator 349 and driver 558 to illustrate the direction of shunt regulator output 372. However, it should be appreciated that the diode 589 is optional. As shown, switch 585 is coupled between the gate of second switch 118 and on voltage $V_{ON}$ 268 and is controlled by the main on signal MAIN_ON 164. In operation, switch 585 is coupled to the gate of second switch 118 as a pull-up switch to drive the second switch 118 fully ON. If the main on signal MAIN_ON 164 is asserted, the switch 585 is closed and the primary drive signal DR 138 (e.g. gate voltage of the second switch 118) is substantially the on voltage $V_{ON}$ 268. As mentioned above, the value of the on voltage $V_{ON}$ 268 may selected such that the second switch 118 is fully ON and conducts the drain current $I_D$ 119.

Switch 586 is coupled between the gate of second switch 118 and off voltage $V_{OFF}$ 269. The switch 586 is controlled by the off signal OFF 162. In operation, switch 586 is coupled to the gate of the second switch 118 as a pull-down switch to drive the second switch 118 fully OFF. If the off signal OFF 162 is asserted, the switch 585 is closed and the primary drive signal DR 138 (e.g. gate voltage of the second switch 118) is substantially the off voltage $V_{OFF}$ 269. The value of the off voltage $V_{OFF}$ 269 may be selected such that the second switch 118 is fully OFF and cannot conduct current.

Resistor 588 and switch 587 is shown as coupled between the gate of second switch 118 and input return 111. As shown, the switch 587 is controlled by branch drive signal BR 165. The shunt regulator output 372 is coupled to resistor R3 588 and the gate of second switch 118 through diode 589. In operation, if the branch drive signal BR 165 is asserted, both the branch switch 152 and switch 587 are ON. The level of the primary drive signal DR 138 (e.g. the gate voltage of second switch 118) is determined by the shunt regulator 349. The shunt regulator 349 senses the branch current $I_{BR}$ 168 and provides the shunt regulator output 372 when the branch drive signal BR 165 indicates that the branch switch 152 is ON (e.g. or conducting). Further, the shunt regulator 349 senses when the branch current $I_{BR}$ 168 has reached a branch current threshold $I_{BRTH}$ and varies the shunt regulator output 372 to prevent the branch current $I_{BR}$ 168 from exceeding the branch current threshold $I_{BRTH}$. As shown, the shunt regulator output 372 may be a voltage value which is determined by the shunt regulator 349. The shunt regulator output 372 is utilized as the value of the primary drive signal DR 138 (e.g. the gate voltage of second switch 118) and the branch current $I_{BR}$ 168 is regulated to below the branch current threshold $I_{BRTH}$ by controlling the conduction of second current $I_1$ 120 by the second switch 118.

Figure 5B:
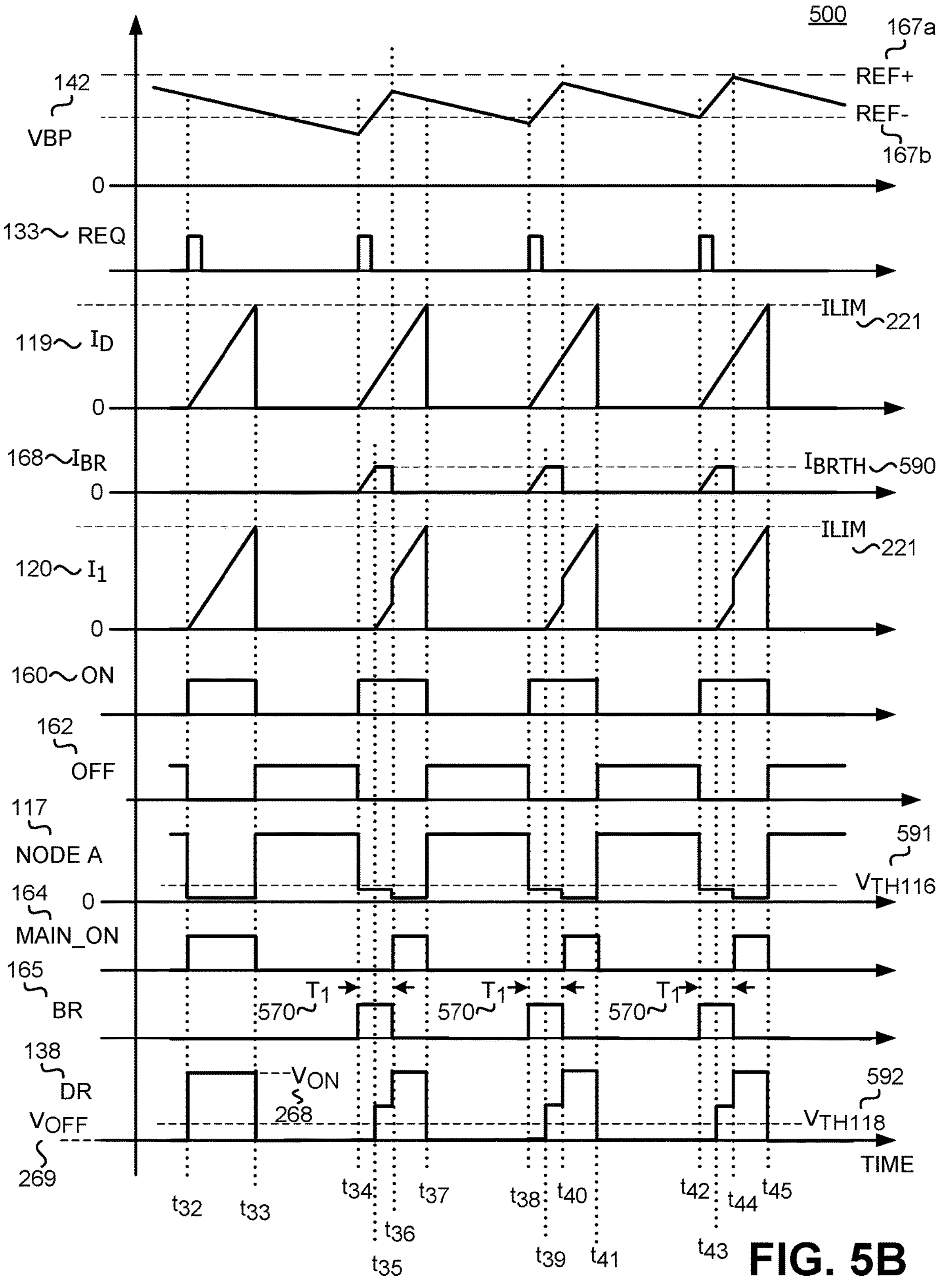
FIG. 5B is a timing diagram illustrating example waveforms of the controller with branch switch, branch control, and shunt regulator of FIG. 5A, in accordance with embodiments of the present disclosure.

FIG. 5B is a timing diagram 500 illustrating example waveforms of the first controller 532 of FIG. 5A. The example waveforms are illustrative of the power converter 100 operating in discontinuous conduction mode (DCM). The bypass voltage VBP 142, request signal REQ 133, drain current $I_D$ 119, branch current $I_{BR}$ 168, second current $I_1$ 120, on signal ON 160, off signal OFF 162, the voltage at node A 117, main on signal MAIN_ON 164, branch drive signal BR 165, and primary drive signal DR 138 are illustrated. In the example shown, comparator 156 has hysteresis and the upper reference REF+ 167*a* and lower reference REF− 167*b* illustrated in FIG. 5B represent the hysteresis thresholds for reference REF 167. The bypass regulation signal BP_REG 163 is logic high when the bypass voltage VBP 142 falls below the lower reference REF− 167*b* and is logic low when the bypass voltage VBP 142 reaches the upper reference REF+ 167*a*. Similar to other figures, the primary drive signal DR 138 is a voltage signal and the voltage value of the primary drive signal DR 138 controls the value of second switch current $I_1$ 120 conducted by the second switch 118. It should be appreciated that similarly named and numbered elements couple and function as described above.

The switching cycle between times $t_{32}$ to $t_{34}$ represents a normal switching cycle of the power switch S1 114 in which the second switch 118 is fully turned ON and energy is transferred from the input to the output of the power converter 100. However, the switching cycles between times $t_{34}$ to $t_{38}$, times $t_{38}$ to $t_{42}$, and $t_{42}$ onward represent charging cycles in which the branch switch 152 is turned ON to charge the bypass capacitor 144. During these cycles, the second switch 118 is utilized to regulate the branch current $I_{BR}$ 168 below the branch current threshold $I_{BRTH}$ 590. At least one difference shown in timing diagram 500 as compared to the other timing diagrams, during a charging cycle the branch switch 152 is turned on for a period $T_1$ 570 of each charging cycle to charge the bypass capacitor 144. The remainder of the charging cycle resumes to a normal switching cycle after the period $T_1$ 570.

At time $t_{32}$, a request event (pulse) is received in the request signal REQ 133 and The on signal ON 160 is asserted while the off signal OFF 162 is deasserted by main control 148. Further, the bypass voltage VBP 142 is greater than the lower reference REF− 167*b* and the branch switch 152 is not turned on to redirect a portion of the drain current $I_D$ 119 to charge the bypass capacitor 144. Branch control 150 asserts the main on signal MAIN_ON 164 such that the main on signal MAIN_ON 164 substantially follows the on signal ON 160. The branch drive signal BR 165 is also not asserted by branch control 150 and branch switch 152 does not conduct, indicated by the substantially zero branch current $I_{BR}$ 168 between times $t_{32}$ and $t_{33}$.

Between times $t_{32}$ and $t_{33}$, the primary drive signal DR 138 is substantially the on voltage $V_{ON}$ 268, which is the voltage to turn ON the second switch 118 such that the drain current $I_D$ 119 and the second current $I_1$ 120 are determined by the components coupled to the power switch S1 104. As such, the second switch 118 is fully ON and the voltage at node A 117 is a small near-zero value. For example, the voltage at node A 117 when the second switch 118 is fully on may be substantially 100 mV. When the second switch 118 is conducting the second current $I_1$ 120 is substantially equal to the drain current $I_D$ 119.

At time $t_{33}$, the drain current $I_D$ 119 reaches the current limit ILIM 221 and the power switch S1 114 is turned OFF. The off signal OFF 162 is asserted while both on signal ON 160 and main on signal MAIN_ON 164 are deasserted. The drive signal DR 138 transitions to the off voltage $V_{OFF}$ 269, which is the voltage value such that the second switch 118 cannot conduct current and the drain current $I_D$ 119 and second current $I_1$ 120 fall to zero. Between times $t_{33}$ and $t_{34}$, when the power switch S1 114 is OFF, the voltage at node A 117 is at a high value above the threshold $V_{TH116}$ 591 of the first switch 116 such that the first switch 116 is in cutoff and does not conduct current.

At time $t_{34}$, a request event is received in the request signal REQ 133 and the on signal ON 160 is asserted while the OFF signal 162 is deasserted. The bypass voltage VBP 142 is below the lower reference REF− 167*b* when and a portion of the drain current $I_D$ 119 is utilized to charge the bypass capacitor 144. Branch control 550 asserts the branch drive signal BR 165 to turn ON the branch switch 152 for period $T_1$ 570, shown as the duration between times $t_{34}$ and $t_{36}$. As shown, the bypass voltage VBP 142 begins to increase. The primary drive signal DR 138 remains at the off voltage $V_{OFF}$ 269 to prevent the second switch S1 118 from conducting however, the voltage at node 117 falls to a value above input return 111 (shown as 0 V in FIG. 5A) but below the threshold $V_{TH116}$ 591 of the first switch 116.

Between times $t_{34}$ and $t_{35}$, the branch current $I_{BR}$ 168 is less than the branch current threshold $I_{BRTH}$ 590. As such, the shunt regulator 349 does not alter the primary drive signal DR 138 and the second switch 118 does not conduct. The branch current $I_{BR}$ 168 is substantially the drain current $I_D$ 119 and the second current $I_1$ 120 is substantially zero.

At time $t_{35}$, the branch current $I_{BR}$ 168 reaches the branch current threshold $I_{BRTH}$ 590 and the shunt regulator 349 provides the shunt regulator output 372 such that the driver 558 controls the second switch 118 ON and controls the amount of current (e.g. second current $I_1$ 120) the second switch 118 conducts. As shown, the primary drive signal DR 138 transitions to a value above the threshold $V_{TH118}$ 592 of the second switch 118 such that the current conducted by the second switch 118 (e.g. second current $I_1$ 120) is dependent on the gate voltage of the second switch 118 (e.g. the primary drive signal DR 138). As such, shunt regulator 349 regulates the branch current $I_{BR}$ 168.

Between times $t_{35}$ and $t_{36}$, the shunt regulator 349 and driver 358 are controlling the conduction of second switch 118 such that the branch current $I_{BR}$ 168 remains at the branch current threshold $I_{BRTH}$ 590. The remaining drain current $I_D$ 119 not conducted by the branch switch 152 as branch current $I_{BR}$ 168 is conducted by the second switch 118 as second current $I_1$ 120. Between times $t_{35}$ and $t_{36}$, the bypass voltage VBP 142 has increased above lower reference REF− 167*b* but has not reached the upper reference REF+ 167*a*.

At time $t_{36}$, the period $T_1$ 570 ends. It should be appreciated that the duration of period $T_1$ 570 may be determined by capacitor C1 581 and resistor R1 582 shown in FIG. 5A. Branch control 550 deasserts the branch drive signal BR 165 and asserts the main on signal MAIN_ON 164 to substantially follow the on signal ON 160. The voltage at node A 117 falls to a near-zero value while the primary drive signal DR 138 transitions to the on voltage $V_{ON}$ 268. The second switch 118 is fully ON while the branch switch 152 is turned OFF. Between times $t_{36}$ to $t_{37}$, the branch current $I_{BR}$ 168 is substantially zero while the second current $I_1$ 120 is substantially the drain current $I_D$ 119. Once the branch switch 152 is turned OFF, the bypass voltage VBP 142 begins to decrease.

At time $t_{37}$, the drain current $I_D$ 119 reaches the current limit ILIM 221 and the power switch S1 114 is turned off. The on signal ON 160 is deasserted while the off signal OFF 162 is asserted. The drive signal DR 138 transitions to the off voltage $V_{OFF}$ 269 and the voltage at node A 117 is at a high value above the threshold $V_{TH116}$ 591 of the first switch 116. As such, both the first switch 116 and second switch 118 are not conducting and the drain current $I_D$ 119 and second current $I_1$ 120 fall to zero. At time $t_{38}$, another request event is received in the request signal REQ 133 and the bypass voltage VBP 142 is below the upper threshold REF+ 167*a* and the lower reference REF− 167*b*. It should be appreciated that the cycle shown between times $t_{38}$ to $t_{42}$ is similar to the cycle discussed above between times $t_{34}$ to $t_{38}$. The branch drive signal BR 165 is asserted to turn ON the branch switch 152 for a period $T_1$ 570 to charge the bypass capacitor 144. During period $T_1$ 570, the branch current $I_{BR}$ 168 is regulated below the branch current threshold $I_{BRTH}$ 590 by controlling the second current $I_1$ 120. After period $T_1$ 570, the branch switch 152 is turned OFF and the second switch 118 is fully turned ON and the second switch 118 conducts the drain current $I_D$ 119 until the drain current $I_D$ 119 reaches the current limit ILIM 221 and the power switch S1 114 is turned OFF. During this switching cycle, the bypass voltage VBP 142 does not reach the upper threshold REF+ 167*a*.

At time $t_{42}$, another request event is received in the request signal REQ 133 and the bypass voltage VBP 142 is below the upper threshold REF+ 167*a*. For the switching period beginning at time $t_{42}$, the bypass voltage VBP 142 reaches the threshold REF+ 167 at time $t_{44}$. As such, at time $t_{44}$ the cycle resumes to a normal switching cycle, main on signal MAIN_ON 164 is asserted and the second switch 118 is fully turned ON to conduct the drain current $I_D$ 119.

Figure 6:
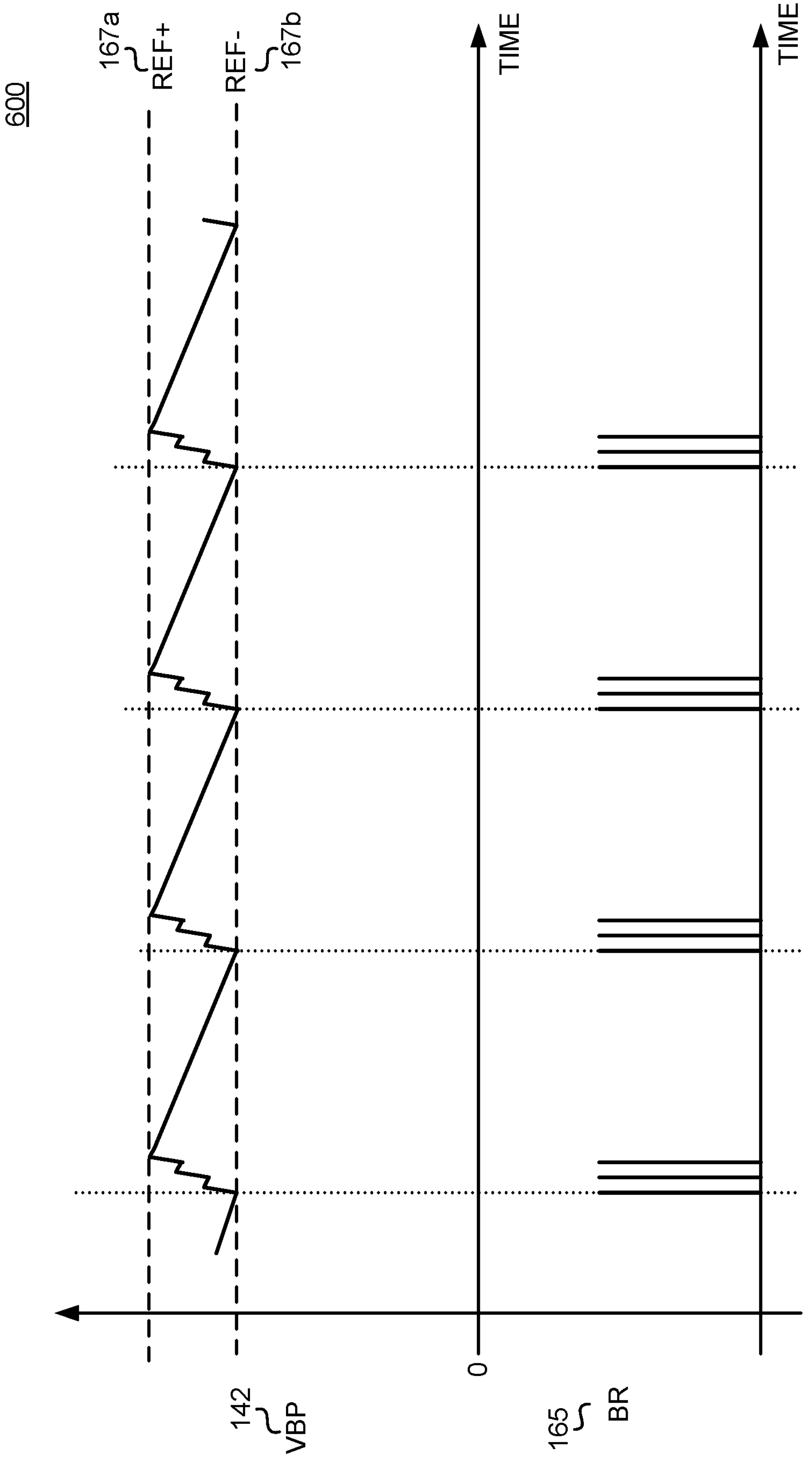
FIG. 6 is a timing diagram illustrating one example of a bypass voltage of a bypass capacitor and a branch control signal, in accordance with embodiments of the present disclosure.

FIG. 6 illustrates timing diagram 600 of an example bypass voltage VBP 142 and branch drive signal BR 165. It should be appreciated similarly named and numbered elements couple and function as described above. In one embodiment, the branch switch 152 may be turned ON for a fixed number of consecutive switching cycles. In a further embodiment, the branch switch 152 may not be turned ON for more than a fixed number of consecutive switching cycles. For the example shown in FIG. 6, the branch switch 152 is turned ON for three consecutive switching cycles. As shown, when the bypass voltage VBP 142 reaches the lower reference REF− 167*b*, charging cycles may begin and the branch drive signal BR 165 turns ON the branch switch 152. Charging cycles are stopped when the bypass voltage VBP 142 reaches the upper reference REF+ 167*a*. When the bypass voltage VBP 142 reaches the lower reference REF− 167*b*, the branch drive signal BR 165 pulses to a logic high value to turn on the branch switch 152.

In one example, the branch switch 152 is turned ON for a period $T_1$, as discussed with respect to FIGS. 5A and 5B, however the branch switch 152 may be turned ON as discussed with FIGS. 1, 2, 3, 4A and 4B. When the branch switch 152 is ON, the bypass voltage VBP 142 is increasing. When the branch switch 152 is OFF, the bypass voltage VBP 142 is decreasing. As shown in timing diagram 600, the branch drive signal BR 165 turns ON the branch switch 152 for three consecutive switching cycles and the bypass voltage VBP 142 has reached the upper reference REF+ 167*a*. The period $T_1$ may be selected such that it takes three consecutive switching cycles for the bypass voltage VBP 142 to reach the upper reference REF+ 167*a* from the lower reference REF− 167*b*. However, it should be appreciated that another number of consecutive switching cycles could also be utilized.

Figure 7:
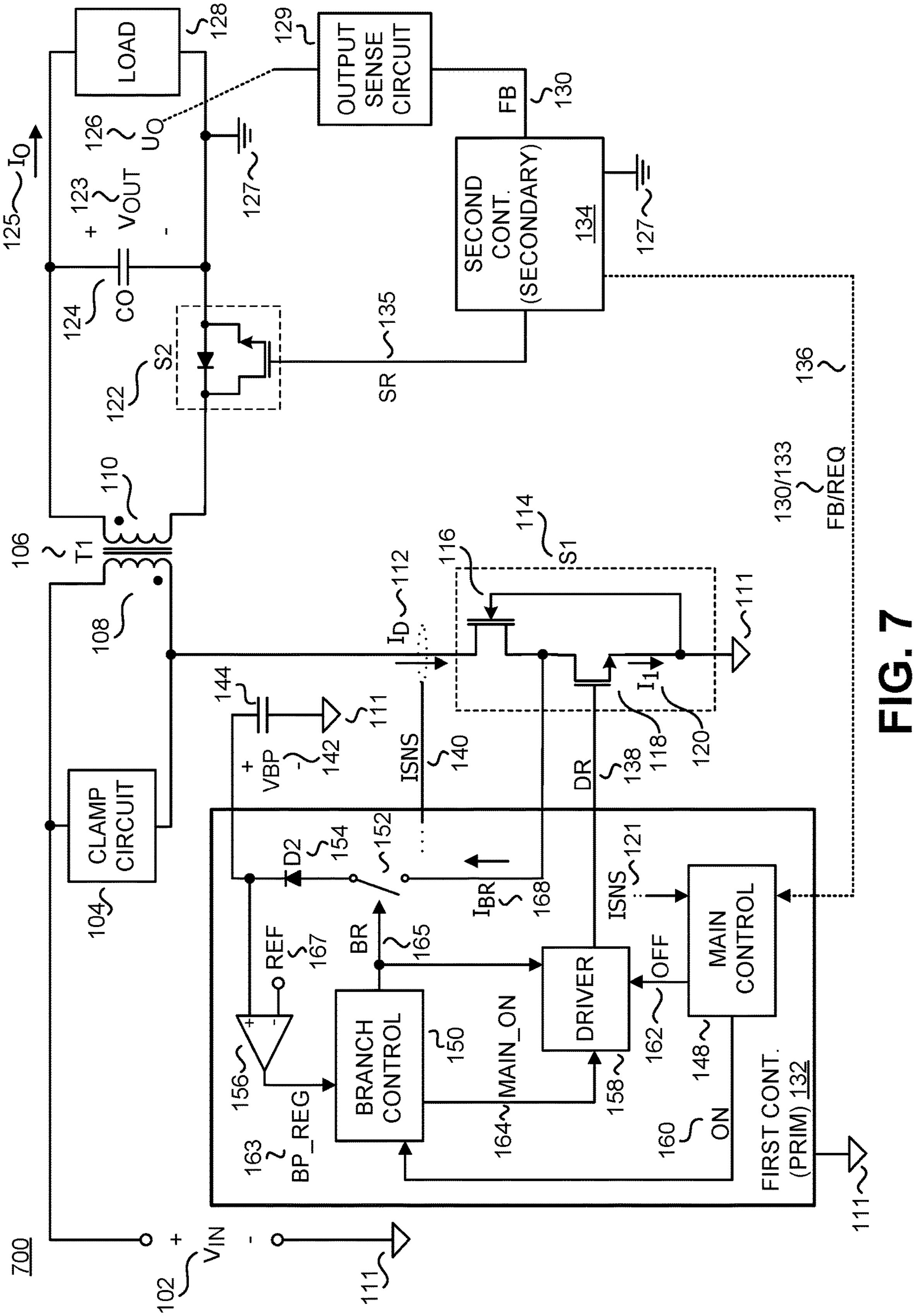
FIG. 7 is schematic diagram of another example isolated power converter including a controller with a branch switch and branch control, in accordance with embodiments of the present disclosure.

FIG. 7 illustrates example isolated power converter 700 including a first controller 132 with a branch switch 152 and branch control 150. It should be appreciated that the power converter 700 shares many similarities with the power converter 100 of FIG. 1, and similarly named and numbered elements couple and function as described above. At least one difference, however, is the power converter 700 does not include auxiliary winding 112 and diode D1 146. As such, the bypass voltage VBP 142 of bypass capacitor 144 is generated by the first controller 132. Although the first controller 132 of FIG. 1 is shown, it should be appreciated that the embodiments of the first controller discussed with respect to FIGS. 3, 4A, 4B, 5A, and 5B may also be utilized with the power converter 700.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples:

Example 1. A first controller for a power converter, the first controller comprising a driver configured to provide a drive signal to turn ON and turn OFF a power switch to control energy delivery between an input and an output of the power converter, wherein the power switch includes a first switch and a second switch coupled in a cascode configuration, and wherein the first switch is a normally-on device and the second switch is a normally-off device; a supply terminal coupled to a bypass capacitor that provides operating power to the first controller, wherein the bypass capacitor has a bypass voltage; a branch switch coupled to a node between the first switch and the second switch; and a branch control configured to receive a regulation signal representative of a comparison of the bypass voltage to a bypass reference, wherein the branch control is configured to turn ON the branch switch if the bypass voltage is below the bypass reference to redirect at least a portion of a drain current of the power switch from the node to the bypass capacitor.

Example 2. The first controller of example 1, wherein the driver is configured to turn ON and turn OFF the second switch to control the turn ON and turn OFF the power switch.

Example 3. The first controller of example 1 or 2, wherein the branch control is configured to turn ON the branch switch concurrently with a switching cycle of the power switch.

Example 4. The first controller of any one of examples 1 to 3, wherein the branch control is configured to turn ON the branch switch for a fixed period of time.

Example 5. The first controller of any one of examples 1 to 4, wherein the branch control is configured to turn OFF the branch switch if the bypass voltage reaches the bypass reference or the drain current of the power switch reaches a current limit.

Example 6. The first controller of any one of examples 1 to 5, wherein the driver is configured to turn ON the second switch if the branch switch is OFF and the drain current is less than the current limit.

Example 7. The first controller of any one of examples 1 to 6, wherein the driver is configured to turn OFF the second switch when the branch switch is turned ON and the branch switch conducts the drain current of the power switch from the node to the bypass capacitor.

Example 8. The first controller of any one of examples 1 to 7, further comprising a shunt regulator configured to sense and regulate a branch current conducted by the branch switch to be less than a branch current threshold, wherein the shunt regulator and the driver regulates the branch current by controlling a second current conducted by the second switch, and wherein the branch current is substantially the portion of the drain current redirected from the node to the bypass capacitor and the second current is a remaining portion of the drain current.

Example 9. The first controller of any one of examples 1 to 8, wherein the shunt regulator is configured to provide a shunt output voltage to the driver, wherein the driver determines a gate voltage of the second switch in response to the shunt output voltage, and wherein the second current conducted by the second switch is responsive to the gate voltage of the second switch.

Example 10. The first controller of any one of examples 1 to 9, wherein the driver turns ON the second switch prior to the branch control turning ON the branch switch if the power converter is operating in continuous conduction mode.

Example 11. The first controller of any one of examples 1 to 10, wherein the branch switch is turned on for a fixed number of consecutive switching cycles.

Example 12. A first controller for a power converter, the first controller comprising: a power switch, wherein the power switch comprises a first switch and a second switch coupled in a cascode configuration, wherein the first switch is a normally-on device and the second switch is a normally-off device; a branch switch coupled to a node between the first switch and the second switch, the branch switch further coupled to a bypass capacitor; a driver configured to provide a drive signal to control the turn ON and turn OFF the power switch to control energy delivery between an input side and an output side of the power converter, wherein the driver is configured to turn ON and turn OFF the second switch to control the turn ON and turn OFF of the power switch; a main control configured to receive a request signal representative of turning on the power switch, wherein the main control determines if the power switch should be ON or OFF; a comparator coupled to receive a bypass reference and a bypass voltage of the bypass capacitor; and a branch control coupled to the comparator and the main control, wherein branch control is configured to turn ON the branch switch if the bypass voltage is below the bypass reference and the main control determines to turn ON the power switch, wherein a branch current conducted by the branch switch is at least a portion of a drain current conducted by the first switch.

Example 13. The first controller of example 12, wherein the branch control is configured to turn ON the branch switch for a fixed period of time.

Example 14. The first controller of examples 12 or 13, wherein the branch control is configured to turn OFF the branch switch if the bypass voltage reaches the bypass reference or the main control determines to turn OFF the power switch.

Example 15. The first controller of any one of examples 12 to 14, wherein the driver is configured to turn ON the second switch if the branch switch is OFF and the main control determines to turn ON the power switch.

16. The first controller of any one of examples 12 to 15, wherein the driver is configured to turn OFF the second switch when the branch switch is turned ON and the branch current is substantially the drain current conducted by the first switch.

17. The first controller of any one of examples 12 to 16, further comprising a shunt regulator coupled to the branch control and the driver, wherein the shunt regulator is configured to sense and regulate the branch current to be less than a branch current threshold, and wherein the driver controls a second current conducted by the second switch in response to the shunt regulator.

Example 18. The first controller of any one of examples 12 to 17, wherein the shunt regulator is configured to provide a shunt output voltage to the driver, wherein the driver determines a gate voltage of the second switch in response to the shunt output voltage and the second current is responsive to the gate voltage of the second switch.

Example 19. The first controller of any one of examples 12 to 18, wherein the driver turns ON the second switch prior to the branch control turning ON the branch switch if the power converter is operating in continuous conduction mode.

Example 20. The first controller of any one of examples 12 to 19, wherein the first controller is coupled to the input of the power converter and the request signal is received from a second controller coupled to the output of the power converter, and wherein the request signal is received through a magnetic communication link between the first controller and the second controller.

Example 21. The first controller of any one of examples 12 to 20, wherein the bypass capacitor is coupled to provide operating power to the first controller.

What is claimed is:

1. A controller for a power converter configured to control a turn ON and turn OFF of a power switch to deliver energy between an input and an output of the power converter, the controller comprising:

- a driver configured to provide a drive signal to control the power switch, wherein the power switch includes a first switch and a second switch;
- a terminal configured to be coupled to a capacitance, wherein the terminal is coupled to receive operating power for the controller;
- a branch switch coupled to the second switch;
- a branch control configured to turn ON the branch switch in response to a comparison of a voltage at the terminal with a reference to conduct a branch current to the terminal, wherein the branch current is at least a first portion of a drain current conducted by the first switch; and
- a regulator configured to sense the branch current, wherein the regulator and driver are configured to regulate the branch current by keeping the second switch at least partially ON during an on-time of the branch switch or by turning the second switch at least partially ON in response to the branch current reaching a branch current threshold, wherein the branch current threshold is less than or equal to the drain current conducted by the first switch.

2. The controller of claim 1, wherein the driver is configured to turn ON and turn OFF the second switch to control the turn ON and turn OFF of the power switch.

3. The controller of claim 1, wherein the first switch is a normally-on device and the second switch is a normally-off device.

4. The controller of claim 3, wherein a gate of the first switch is coupled to a source of the second switch.

5. The controller of claim 1, further comprising:

- a comparator coupled to the terminal and configured to output to the branch control a regulation signal representative of the comparison of the voltage at the terminal with the reference.

6. The controller of claim 1, wherein the branch control is configured to turn ON the branch switch in response to a determination to turn ON the power switch.

7. The controller of claim 6, wherein the branch control is configured to turn ON the branch switch during at least a portion of the time in which the power switch is determined to be ON.

8. The controller of claim 1, wherein the branch control is configured to turn ON the branch switch for a fixed period of time.

9. The controller of claim 8, wherein the driver is configured to turn ON the second switch such that a current conducted by the second switch is substantially the drain current after the fixed period of time.

10. The controller of claim 1, wherein the branch control is configured to turn OFF the branch switch in response to the voltage at the terminal reaching the reference or the drain current reaching a current limit.

11. The controller of claim 1, wherein the branch switch is turned ON in each of a fixed number of consecutive switching cycles of the power switch.

12. The controller of claim 1, wherein the driver is configured to turn ON the second switch in response to the turn OFF of the branch switch and the drain current being less than a current limit.

13. The controller of claim 1, wherein the driver is configured to turn ON the second switch such that a current conducted by the second switch is substantially the drain current after the turn OFF of the branch switch.

14. The controller of claim 1, wherein the driver is configured to turn ON the second switch prior to the turn ON of the branch switch if the power converter is operating in continuous conduction mode.

15. The controller of claim 1, wherein the regulator is configured to provide a shunt output voltage to the driver, wherein the driver determines a gate voltage of the second switch in response to the shunt output voltage and a current conducted by the second switch is responsive to the gate voltage of the second switch.

16. The controller of claim 1, further comprising:

a main control configured to receive a request signal representative of turning ON the power switch, wherein the main control is configured to determine if the power switch should be ON or OFF, wherein:

the branch control is coupled to the main control, wherein the branch control is configured to turn ON the branch switch in response to the comparison of the voltage at the terminal and the reference and a determination to turn ON the power switch.

17. The controller of claim 16, wherein the branch control is configured to turn OFF the branch switch in response to the voltage at the terminal reaching the reference or in response to a determination to turn OFF the power switch.

18. The controller of claim 17, wherein the main control is configured to receive a current sense signal representative of the drain current and configured to determine to turn OFF the power switch in response to the drain current reaching a current limit.

19. The controller of claim 16, wherein the driver is configured to turn ON the second switch in response to the determination by the main control to turn ON the power switch and the branch switch being OFF.

20. The controller of claim 16, wherein the controller is configured to be coupled to a communication link to receive the request signal.

21. The controller of claim 1, wherein the second switch conducts a remaining portion of the drain current.

22. A controller for a power converter configured to control a turn ON and turn OFF of a power switch to deliver energy between an input and an output of the power converter, the controller comprising:

a driver configured to provide a drive signal to control the power switch, wherein the power switch includes a first switch and a second switch;

a terminal configured to be coupled to a capacitance, wherein the terminal is coupled to receive operating power for the controller;

a branch switch coupled to the power switch and the terminal;

a branch control configured to turn ON the branch switch in response to a comparison of a voltage at the terminal with a reference to conduct a branch current to the terminal, wherein the branch current is at least a first portion of a drain current to the power switch when the power switch is ON; and a regulator to sense the branch current, wherein the regulator and driver are configured to regulate the branch current by shunting a second portion of the drain current through the second switch to keep the branch current at or below a branch current threshold.

23. The controller of claim 22, wherein the branch control is configured to turn ON the branch switch in response to a determination to turn ON the power switch.

24. The controller of claim 23, wherein the branch control is configured to turn ON the branch switch during at least a portion of the time in which the power switch is determined to be ON.

25. The controller of claim 22, wherein the branch control is configured to turn ON the branch switch for a fixed period of time.

26. The controller of claim 22, wherein the branch control is configured to turn OFF the branch switch in response to the voltage at the terminal reaching the reference or the drain current reaching a current limit.

27. The controller of claim 22, wherein the driver is configured to turn ON the power switch such that the power switch conducts the drain current in response to the turn OFF of the branch switch and the drain current being less than a current limit.

28. The controller of claim 22, wherein the second portion of the drain current is a remaining portion of the drain current.

* * * * *